(12) United States Patent
Johnson et al.

(10) Patent No.: US 10,884,094 B2
(45) Date of Patent: Jan. 5, 2021

(54) ACQUIRING AND TRACKING A SATELLITE SIGNAL WITH A SCANNED ANTENNA

(71) Applicants: Mikala Johnson, Seattle, WA (US);
Timothy Mason, Redmond, WA (US);
Bruce Rothaar, Woodinville, WA (US);
Todd Richard Czerner, Scottsdale, AZ (US)

(72) Inventors: Mikala Johnson, Seattle, WA (US);
Timothy Mason, Redmond, WA (US);
Bruce Rothaar, Woodinville, WA (US);
Todd Richard Czerner, Scottsdale, AZ (US)

(73) Assignee: KYMETA CORPORATION, Redmond, WA (US)

(*) Notice: Subject to any disclaimer, the term of this patent is extended or adjusted under 35 U.S.C. 154(b) by 574 days.

(21) Appl. No.: 15/445,541

(22) Filed: Feb. 28, 2017

(65) Prior Publication Data
US 2017/0254903 A1 Sep. 7, 2017

Related U.S. Application Data

(60) Provisional application No. 62/302,042, filed on Mar. 1, 2016, provisional application No. 62/302,051, filed
(Continued)

(51) Int. Cl.
*H04B 7/185* (2006.01)
*G01S 3/38* (2006.01)
(Continued)

(52) U.S. Cl.
CPC ............ *G01S 3/38* (2013.01); *G01S 3/043* (2013.01); *G01S 3/42* (2013.01); *H01Q 1/1257* (2013.01);
(Continued)

(58) Field of Classification Search
CPC .. G01S 3/043; G01S 3/38; G01S 3/42; H01Q 3/08; H01Q 3/04; H01Q 21/064;
(Continued)

(56) References Cited

U.S. PATENT DOCUMENTS 5,175,561 A 12/1992 Goto
5,940,026 A * 8/1999 Popeck ............... G01S 5/0247
342/357.36
(Continued)

FOREIGN PATENT DOCUMENTS

DE 4026432 A1 2/1991
EP 1122813 8/2001
(Continued)

OTHER PUBLICATIONS

PCT Application No. PCT/US2017/020232, International Search Report and the Written Opinion, dated Jun. 20, 2017, 16 pgs.
(Continued)

*Primary Examiner* — Chuong P Nguyen
(74) *Attorney, Agent, or Firm* — Womble Bond Dickinson (US) LLP

(57) ABSTRACT

A method and apparatus is disclosed herein for acquiring and tracking a satellite signal with an antenna. In one embodiment, the method comprises a) perturbing one or more of roll, pitch and yaw angles of an antenna orientation to create variant orientations associated with a first search pattern; b) computing new scan and polarization angles, in response to perturbed roll, pitch and yaw angles, for each of the variant orientations; c) receiving a radio-frequency (RF) signal from a satellite for each of the variant orientations; d) generating one or more receiver metrics representing a received RF signal associated with each of the variant orientations; e) selecting, as a new orientation, one of the variant orientations based on the one or more receiver
(Continued)

metrics; and f) repeating a)-e) with the new orientation with a second search pattern narrower than the first search pattern.

24 Claims, 18 Drawing Sheets

Related U.S. Application Data on Mar. 1, 2016, provisional application No. 62/438,282, filed on Dec. 22, 2016.

(51) Int. Cl.
| | | |
|---|---|---|
| *G01S 3/04* | (2006.01) | |
| *G01S 3/42* | (2006.01) | |
| *H01Q 1/12* | (2006.01) | |
| *H01Q 3/08* | (2006.01) | |
| *H01Q 21/06* | (2006.01) | |
| *H01Q 13/10* | (2006.01) | |
| *H01Q 15/00* | (2006.01) | |

(52) U.S. Cl.
CPC ............. *H01Q 3/08* (2013.01); *H01Q 13/103* (2013.01); *H01Q 15/0086* (2013.01); *H01Q 21/064* (2013.01); *H01Q 21/065* (2013.01); *H04B 7/185* (2013.01); *H04B 7/18519* (2013.01)

(58) Field of Classification Search
CPC .. H01Q 21/065; H01Q 1/1257; H01Q 13/103; H01Q 15/0086; H04B 7/185; H04B 7/18519
USPC ......................................... 342/354, 368, 372
See application file for complete search history.

(56) References Cited

U.S. PATENT DOCUMENTS

| 6,122,595 | A * | 9/2000 | Varley | G01S 19/47 |
| | | | | 342/357.59 |
| 6,529,161 | B2 * | 3/2003 | Fukushima | H01Q 1/125 |
| | | | | 342/356 |
| 7,009,558 | B1 * | 3/2006 | Fall | G01S 19/47 |
| | | | | 342/359 |
| 7,109,937 | B2 * | 9/2006 | Iluz | H01Q 1/18 |
| | | | | 343/756 |
| 7,522,097 | B2 * | 4/2009 | Wakeman | G01S 7/4026 |
| | | | | 342/13 |
| 8,089,404 | B2 * | 1/2012 | Nichols | H01Q 21/0025 |
| | | | | 342/354 |
| 8,427,384 | B2 * | 4/2013 | Clymer | H01Q 1/185 |
| | | | | 343/776 |
| 8,930,047 | B2 * | 1/2015 | Robinson | H01Q 3/00 |
| | | | | 701/13 |
| 9,774,097 | B2 * | 9/2017 | Clymer | H01Q 1/185 |
| 10,416,276 | B2 * | 9/2019 | Hill | G01C 21/165 |
| 10,483,629 | B1 * | 11/2019 | Silva | H01Q 3/2605 |
| 2004/0087294 | A1 * | 5/2004 | Wang | H04B 7/0671 |
| | | | | 455/276.1 |
| 2004/0233117 | A1 | 11/2004 | Milroy et al. | |
| 2007/0132634 | A1 * | 6/2007 | Wakeman | G01S 7/4026 |
| | | | | 342/174 |
| 2008/0068263 | A1 | 3/2008 | Tekawy et al. | |
| 2012/0249366 | A1 * | 10/2012 | Pozgay | H04B 7/18571 |
| | | | | 342/354 |
| 2015/0236412 | A1 | 8/2015 | Bily et al. | |
| 2016/0006121 | A1 | 1/2016 | El-Sallabi et al. | |
| 2017/0373384 | A1 * | 12/2017 | MacNeille | H01Q 1/3275 |
| 2019/0369263 | A1 * | 12/2019 | Kreeger | H01Q 3/10 |

FOREIGN PATENT DOCUMENTS

| EP | 1229342 | | 8/2002 |
| EP | 1863114 | A1 | 12/2007 |
| WO | 2013134585 | | 9/2013 |

OTHER PUBLICATIONS

International Search Report and Written Opinion received for PCT Patent Application No. PCT/US2017/019743, dated May 31, 2017, 12 pages.
International Preliminary Report on Patentability received for PCT Patent Application No. PCT/US2017/020232, dated Sep. 13, 2018, 11 pages.
International Preliminary Report on Patentability received for PCT Patent Application No. PCT/US2017/019743, dated Sep. 13, 2018, 10 pages.
European Office Action for Application No. 17712880.8 dated Apr. 16, 2020, 6 pages.

* cited by examiner

Perturb one or more of roll, pitch and yaw angles of an antenna orientation to create variant orientations associated with a first search pattern
101

Compute new scan and polarization angles, in response to perturbed roll, pitch and yaw angles, for each of the variant orientations
102

Receive a radio-frequency (RF) signal from a satellite for each of the variant orientations
103

Generate one or more receiver metrics representing a received RF signal associated with each of the variant orientations
104

Select, as a new orientation, one of the variant orientation
105

Repeat the process above with the new orientation with a second search pattern narrower than the first search pattern
106

FIG. 1

```
┌─────────────────────────────────────────────────────────────────────┐
│ Perturb one or more of roll, pitch and yaw angles of an antenna     │
│ orientation to create variant orientations associated with a first  │
│ search pattern                                                      │
│                               701                                   │
└─────────────────────────────────────────────────────────────────────┘
                                  │
┌─────────────────────────────────────────────────────────────────────┐
│ Compute new scan and polarization angles, in response to perturbed  │
│ roll, pitch and yaw angles, for each of the variant orientations    │
│                               702                                   │
└─────────────────────────────────────────────────────────────────────┘
                                  │
┌─────────────────────────────────────────────────────────────────────┐
│ Receive a radio-frequency (RF) signal from a satellite for each of  │
│ the variant orientations                                            │
│                               703                                   │
└─────────────────────────────────────────────────────────────────────┘
                                  │
┌─────────────────────────────────────────────────────────────────────┐
│ Generate one or more receiver metrics representing a received RF    │
│ signal associated with each of the variant orientations             │
│                               704                                   │
└─────────────────────────────────────────────────────────────────────┘
                                  │
┌─────────────────────────────────────────────────────────────────────┐
│ Select, as a new orientation, one of the variant orientation        │
│                               705                                   │
└─────────────────────────────────────────────────────────────────────┘
                                  │
┌─────────────────────────────────────────────────────────────────────┐
│ Repeat the process above with the new orientation with a second     │
│ search pattern narrower than the first search pattern               │
│                               706                                   │
└─────────────────────────────────────────────────────────────────────┘
                                  │
┌─────────────────────────────────────────────────────────────────────┐
│ Generate an offset based on the one or more receiver metrics, add   │
│ pointing corrections to one or more of the scan and polarization    │
│ angles, and apply scan and polarization angles with pointing        │
│ corrections to an electronically steerable antenna                  │
│                               707                                   │
└─────────────────────────────────────────────────────────────────────┘
```

FIG. 7

Perturb one or more of roll, pitch and yaw angles of an antenna orientation to create variant orientations associated with a first search pattern by applying one or more attitude corrections to the roll, pitch and yaw angles of an antenna orientation based on the one or more receiver metrics
801

Dither one or more of the roll, pitch and yaw angles after applying the one or more attitude corrections, such that the new scan and polarization angles can be computed in response to the perturbed roll, pitch and yaw angles comprise dithered scan and polarization angles
802

Compute new scan and polarization angles, in response to perturbed roll, pitch and yaw angles, for each of the variant orientations
803

Receive a radio-frequency (RF) signal from a satellite for each of the variant orientations
804

Generate one or more receiver metrics representing a received RF signal associated with each of the variant orientations
805

Select, as a new orientation, one of the variant orientation along with the attitude corrections for the new orientation
806

Repeat the process above with the new orientation with a second search pattern narrower than the first search pattern
807

FIG. 8

ACQUIRING AND TRACKING A SATELLITE SIGNAL WITH A SCANNED ANTENNA

PRIORITY

The present patent application claims priority to and incorporates by reference the corresponding provisional patent application Ser. No. 62/302,051, titled, "DITHER CONTROL ON AN ANTENNA WITH INDEPENDENT TRANSMIT AND RECEIVE BEAMS," filed on Mar. 1, 2016 and provisional patent application Ser. No. 62/438,282, titled, "Method of Acquiring a Satellite Signal with a Mobile Electronically Scanned Antenna," filed on Dec. 22, 2016.

FIELD OF THE INVENTION

Embodiments of the present invention relate to the field of antennas; more particularly, embodiments of the present invention relate to acquiring and tracking a satellite signal with an antenna.

BACKGROUND OF THE INVENTION

Conventional satellite signal acquisition is the process of adjusting a ground receiver unit so that its antenna and receiver can receive and demodulate the signal from a satellite. This process usually involves electric motors and high-accuracy inclinometers, gyroscopes, and a magnetic compass. During the signal acquisition process, a receiver searches spatially until it can detect a satellite signal and then locks onto the signal and acquires the basic information about the satellite that is transmitting the signal. The receiver may then use this information to receive and decode additional information transmitted by that satellite.

The prior approaches have been to mechanically move the antenna assembly in a spiral pattern with a gimbal. During the search, the movements of the antenna assembly follows a pattern. Dual sinusoidal movements create a spiral pattern that is used to search for a satellite signal with an increasing radius. That is, the acquisition pattern is a spiral caused by sinusoidal motion in two axes.

When a parabolic antenna is attached to a gimbal to communicate between a satellite and an earth station on a moving platform, it is necessary to dynamically determine the correct settings for azimuth, elevation and polarization. This is possible using an IMU (Inertial Measurement Unit), used in conjunction with a GPS, that can report the location and orientation of the parabolic antenna. Using the values from the IMU, a real-time calculation can be made to point the gimbal towards the target satellite and adjust the rotation of the feedhorn to achieve the correct polarization. The accuracy of each is subject to error because the IMU values will contain errors. The parabolic dish is limited in its ability to correct for IMU errors because it cannot independently steer the receive (Rx) beam and the transmit (Tx) beam.

Another class of antennas exists that permits independent steering of the receive and transmit antenna beams. Phased arrays are a well-known example, as well as mechanical arrays such as those sold by Thinkom. Both of these examples use physically separated transmit and receive antennas.

Difficulties also arise when trying to apply the above approaches for signal acquisition as well as dithering in an antenna when the antenna is used to carry the receive (Rx) and transmit (Tx) signals. This is because moving a parabolic antenna to direct the Rx beam also moves the Tx beam accordingly. That is, it is not possible to independently control the Tx pointing. FCC regulations have strict rules about mispointing a Tx signal that is directed towards a satellite because of the potential of inadvertently directing energy at a nearby satellite. Furthermore, large parabolic gimbaled systems cannot use dithering due to their high mass. They rely on very expensive IMU sensors to provide an accurate open-loop pointing solution In some applications a system is built with a Tx antenna on a gimbal and an Rx antenna on its own gimbal, both pointed to the same satellite. The Rx beam can be optimized by using dither steps, but the Tx beam cannot be optimized using the information from the Rx modem because the two are on independent gimbals. Each gimbal adds its own unique contributions to the pointing error due to small mechanical differences. Furthermore, this solution adds complexity, weight, and cost.

SUMMARY OF THE INVENTION

A method and apparatus is disclosed herein for acquiring and tracking a satellite signal with an antenna. In one embodiment, the method comprises a) perturbing one or more of roll, pitch and yaw angles of an antenna orientation to create variant orientations associated with a first search pattern; b) computing new scan and polarization angles, in response to perturbed roll, pitch and yaw angles, for each of the variant orientations; c) receiving a radio-frequency (RF) signal from a satellite for each of the variant orientations; d) generating one or more receiver metrics representing a received RF signal associated with each of the variant orientations; e) selecting, as a new orientation, one of the variant orientations based on the one or more receiver metrics; and f) repeating a)-e) with the new orientation with a second search pattern narrower than the first search pattern.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a flow diagram of one embodiment of an acquisition process.

FIG. 7 is a flow diagram of one embodiment of a dithering process.

FIG. 8 is a flow diagram of another embodiment of the dithering process.

DETAILED DESCRIPTION OF THE PRESENT INVENTION

Figure 2:
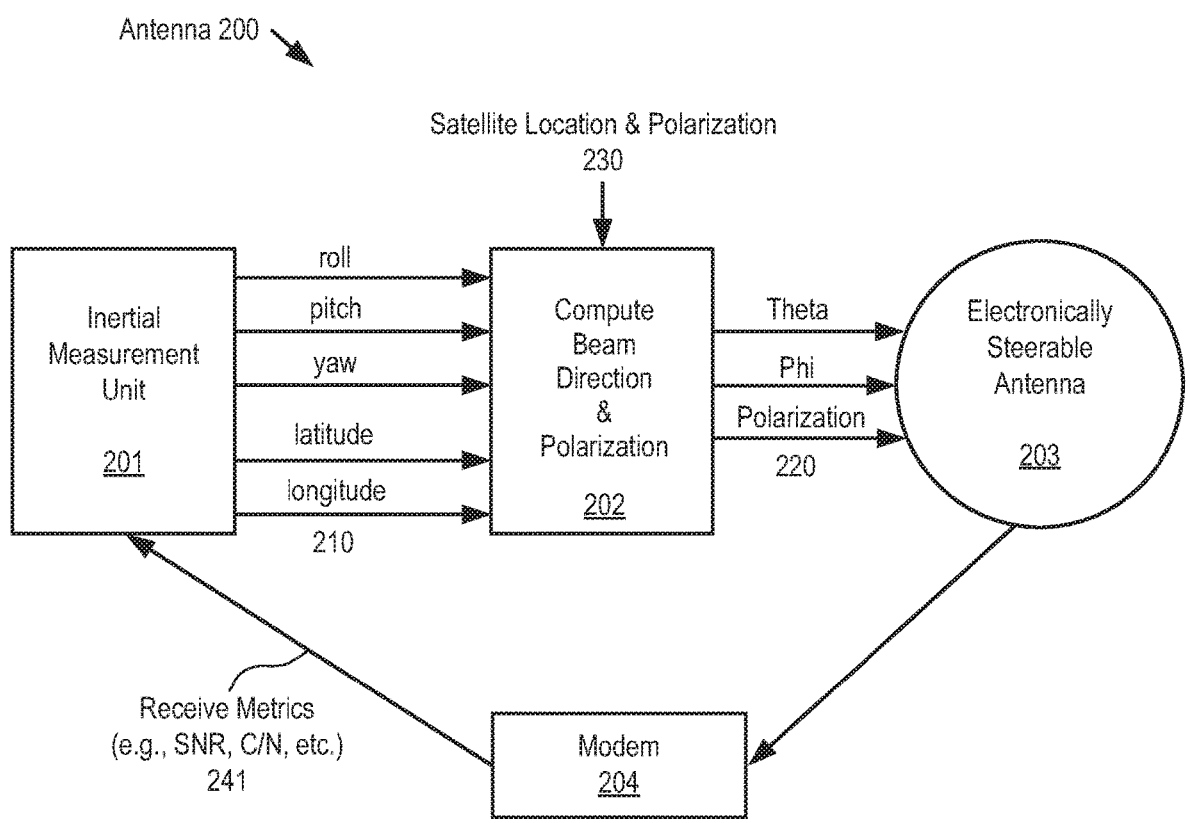
FIG. 2 is a general block diagram of one embodiment of an antenna system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Overview

Techniques disclosed herein direct an antenna to search the sky for a satellite signal at a specific frequency and then lock in on the signal once it has been consistently observed. Subsequently, in one embodiment, the antenna may perform dithering to adjust the pointing direction of the antenna. In one embodiment, the antenna is electronically steerable, as opposed to mechanically steerable, and therefore may be steered in the direction of a satellite without having to mechanically move the antenna. This enables the antenna to achieve acquisition and perform dithering without an individual having to physically be present at the site of the antenna. Furthermore, the acquisition process described herein allows inexpensive sensors to be used to compute a coarse-level acquisition solution. The acquisition process uses feedback from the antenna to find the satellite signal and mitigates for errors in the gyroscopes and magnetometers. Using the techniques disclosed herein, an antenna can immediately connect to a satellite service. That is, the techniques described herein allow the antenna to quickly find the satellite, update the necessary parameters, and connect to the correct satellite.

In one embodiment, an acquisition process is used to perturb the attitude data (e.g., roll, pitch, yaw) used in the satellite geometry solution to create a sampling pattern of multiple points (e.g., 4 pts, 5 pts, . . . , 100 pts, . . . , etc.) in the visible sky. That is, the acquisition process scans multiple points in space with an electronically scanned antenna. This allows the electromagnetic spectrum at many points to be sampled and the best orientation of antenna parameters to be computed. In one embodiment, the sampling pattern of points is a random pattern of non-contiguous points in the visible sky.

After sampling the satellite's signal at the multiple points of the pattern, the pattern is varied according to the results of the sampling the satellite's signal to create a new pattern, and the antenna samples the satellite's signals at points associated with the new pattern. In one embodiment, the direction of beams is oriented towards the point in the pattern for which the antenna received the "best" satellite signal as the direction of the beam for the next pattern of points. Thus, the new pattern of points varies from the previous pattern based on the direction of the antenna beam that resulted in the best received satellite signal. In one embodiment, the best satellite signal may be judged based on at least one of its signal strength, signal to noise ratio (SNR), carrier-to-noise (C/N), energy per symbol to noise power spectral density (Es/No), or energy per bit to noise power spectral density (Eb/No). Other indicators may be used. In one embodiment, the points for the new pattern are created by making variations in attitude (e.g., roll, pitch and yaw) from the point from the previous pattern that was associated with the best received satellite signal. However, the variations in attitude with each new pattern decrease in the amount of variance so that the antenna is able to converge on the satellite signal. The decrease may be linear (e.g., 10%, 20%, etc.) or non-linear, particularly if there is a potential hit on the satellite, to quickly narrow down the search range. In one embodiment, the new pattern includes the same point that produced the best signal in the previous search pattern. If the same "best point" is found in consecutive search patterns, the variance is continually reduced until reaching the "minimum" amount that is to be used to dither during tracking.

Thus, embodiments disclosed herein include antennas and methods for use the same that include one or more of the following features:

acquiring a satellite signal without physical motion of the antenna;

searching the sky in a random pattern;

searching noncontiguous points in the sky;

decreasing the variance of the pattern after a good signal has been observed; and using variations in attitude (e.g., roll, pitch and yaw) to embody the search pattern.

FIG. 1 is a flow diagram of one embodiment of an acquisition process. The process is performed by processing logic that may comprise hardware (e.g., circuitry, dedicated logic, etc.), software (such as is run on a general purpose computer system or a dedicated machine), firmware, or a combination of the three.

Referring to FIG. 1, the process begins by processing logic perturbing one or more of roll, pitch and yaw angles of an antenna orientation to create variant orientations associated with a first search pattern (processing block 101). In one embodiment, the initial antenna orientation is from a strapdown inertial navigation system (INS). In one embodiment, the first search pattern is a random pattern. In one embodiment, the first search (and subsequent search patterns) are a circular pattern. Other patterns may be used. Also, different patterns may be used in different iterations. In one embodiment, the goal is to match the search area to the uncertainty volume of the IMU. Note that a low-cost IMU is likely to result in decent roll and pitch estimates but poorer yaw estimates. Therefore, any patterns covering that volumes is needed, and sampling as few points as necessary is desirable. In one embodiment, the first (and subsequent search patterns) patterns comprise noncontiguous points in the sky.

After perturbing one or more of roll, pitch and yaw angles, processing logic computes new scan and polarization angles, in response to perturbed roll, pitch and yaw angles, for each of the variant orientations (processing block 102).

Using the new scan and polarization angles, processing logic receives an radio-frequency (RF) signal from a satellite for each of the variant orientations (processing block 103) and generates one or more receiver metrics representing a received RF signal associated with each of the variant orientations (processing block 104). In one embodiment, the RF signal from the satellite is received without physically moving an aperture of the antenna. In one embodiment, the one or more signal metrics comprises Signal-to-Noise Ratio (SNR). In another embodiment, the one or more signal metrics comprises Carrier-to-Noise Ratio (C/N).

Based on the one or more receiver metrics, processing logic selects, as a new orientation, one of the variant orientation (processing block 105) and repeats the process above with the new orientation with a second search pattern narrower than the first search pattern (processing block 106). In one embodiment, during acquisition, the antenna orientation from which the variant orientations are generated is included in the new search. In one embodiment, the process is repeated until a consistently observed satellite signal is received. In one embodiment, the variance of the search pattern after a good signal has been observed is decreased. In one embodiment, the second search pattern has a maximum angle that is decreased in comparison with that of the first search pattern. In one embodiment, this process of decreasing the maximum angle for each new search pattern used when repeating the process is used until a consistently observed satellite signal is received.

The acquisition processing, as well as the dither processing described below, is performed by an antenna control and tracking system. FIG. 2 is a general block diagram of one embodiment of an antenna system with such tracking and control. Referring to FIG. 2, antenna system 200 comprises an inertial measurement unit 201, beam direction and polarization computation unit 202 and an electronically steerable antenna 203. Beam direction and polarization computation unit 202 may be part of a beam direction and polarization generator. In one embodiment, antenna 200 also includes modem 204 coupled to electrically steerable antenna 203 and IMU 201.

In one embodiment, electronically steerable antenna 203 comprises an antenna aperture with antenna elements, such as described in more detail below. In another embodiment, electronically steerable antenna 203 comprises an antenna consisting of separable transmit (Tx) and receive (Rx) apertures that are both independently steerable, including their polarization. In yet another embodiment, electronically steerable antenna 203 comprises either interleaved/co-located Tx and Rx apertures, such as the antenna described in U.S. patent application Ser. No. 14/954,415, titled "Combined Antenna Apertures Allowing Simultaneous Multiple Antenna Functionality", filed Nov. 30, 2015, or physically separated apertures that are rigidly mounted to maintain their relative orientation with respect to one another.

In one embodiment, IMU 201 is an electronic device that uses a combination of accelerometers, gyroscopes, magnetometers to detect the attitude and attitude rate of change of the antenna IMU 201 uses the magnetometers to assist in calibrating the antenna against drift.

In one embodiment, IMU 201 generates a number of values 210 that are received by the beam direction and polarization computation unit 202. In one embodiment, values 210 comprise roll, pitch, yaw, latitude and longitude. In one embodiment, values 210 includes the altitude of the antenna. Beam direction and polarization computation unit 202 also receives satellite location (e.g., latitude, longitude, altitude, etc.) and polarization values 230. In one embodiment, the altitude for both the satellite and the antenna is needed to compute the vector between them (which results in the "look angle"). In response to these inputs, beam direction and polarization computation unit 202 generates theta, phi and polarization values 220 (e.g., angles) that are provided to and control electronically steerable antenna 203.

When the antenna is turned on, the acquisition process starts operating. The acquisition process needs an initial orientation to determine where to search for the satellite. In one embodiment, the initial orientation is the orientation from a strap-down inertial navigation system (INS). In another embodiment, the inertial orientation could be a predetermined starting phi, theta, and polarization, with a search of the entire visible area. IMU 201 provides the roll, pitch, yaw, longitude and latitude values 210 associated with the orientation to beam direction and polarization computation unit 202. This orientation is used by beam direction and polarization computation unit 202 with the Earth-to-Satellite and Earth-to-Antenna transformations to compute the scan and polarization angles of the antenna.

IMU 201 also perturbs the roll, pitch and yaw angles of the antenna orientation to enable different scan and polarization angles to be computed. The different scan and polarization angles are associated with an area of uncertainty (i.e., a search volume) in the measurement of the antenna's attitude that is selected to be searched to find the attitude which results in correct pointing to the satellite. In one embodiment, the area of uncertainty represents a volume that is searched and the uncertainty is measured in the orientation angles: roll, pitch, and yaw. IMU 201 provides the perturbed roll, pitch and yaw angles to beam direction and polarization computation unit 202.

Beam direction and polarization computation unit 202 generates theta, phi and polarization values 220 from roll, pitch, yaw, longitude and latitude values 210 and satellite location and polarization values 230 in a manner well-known in the art. The generated theta, phi and polarization values 230 control electronically steerable antenna 203 in a manner well-known in the art.

Measurements are taken in a volume space to attempt to locate the satellite. More specifically, by looking at the received satellite signal from different points in the uncertainty volume that is selected with IMU 201. Data indicative of the received satellite signal obtained by electrically steerable antenna 203 from the different points in the uncertainty volume is feedback to IMU 201 via modem 204 to enable IMU 201 to search the roll, pitch and yaw uncertainty area. In one embodiment, the feedback to IMU 201 is through modem 204. In another embodiment, the feedback is through an onboard receiver. In one embodiment, the Signal-to-Noise Ratio (SNR) (or other signal characterization information (e.g., C/N, etc.)) of each of these variant orientations is recorded. In one embodiment, the orientation with the best SNR is chosen to be the next orientation to try. The attitude data for this new orientation is perturbed and the process repeats. As the search progresses, the maximum angle of the search pattern is decreased. That is, the amount that one or more of the roll, pitch and yaw are changed is reduced with each iteration.

Initially there will be large hops made in an attempt to identify a location of the satellite, and as the acquisition process zeroes in on the satellite, the hops become smaller. Therefore, the uncertainty volume is reduced during subsequent iterations and at each new uncertainty volume, the number of random point measurements are taken at a number of random points to determine whether the satellites are really there until the satellite is actually identified.

Figure 3:
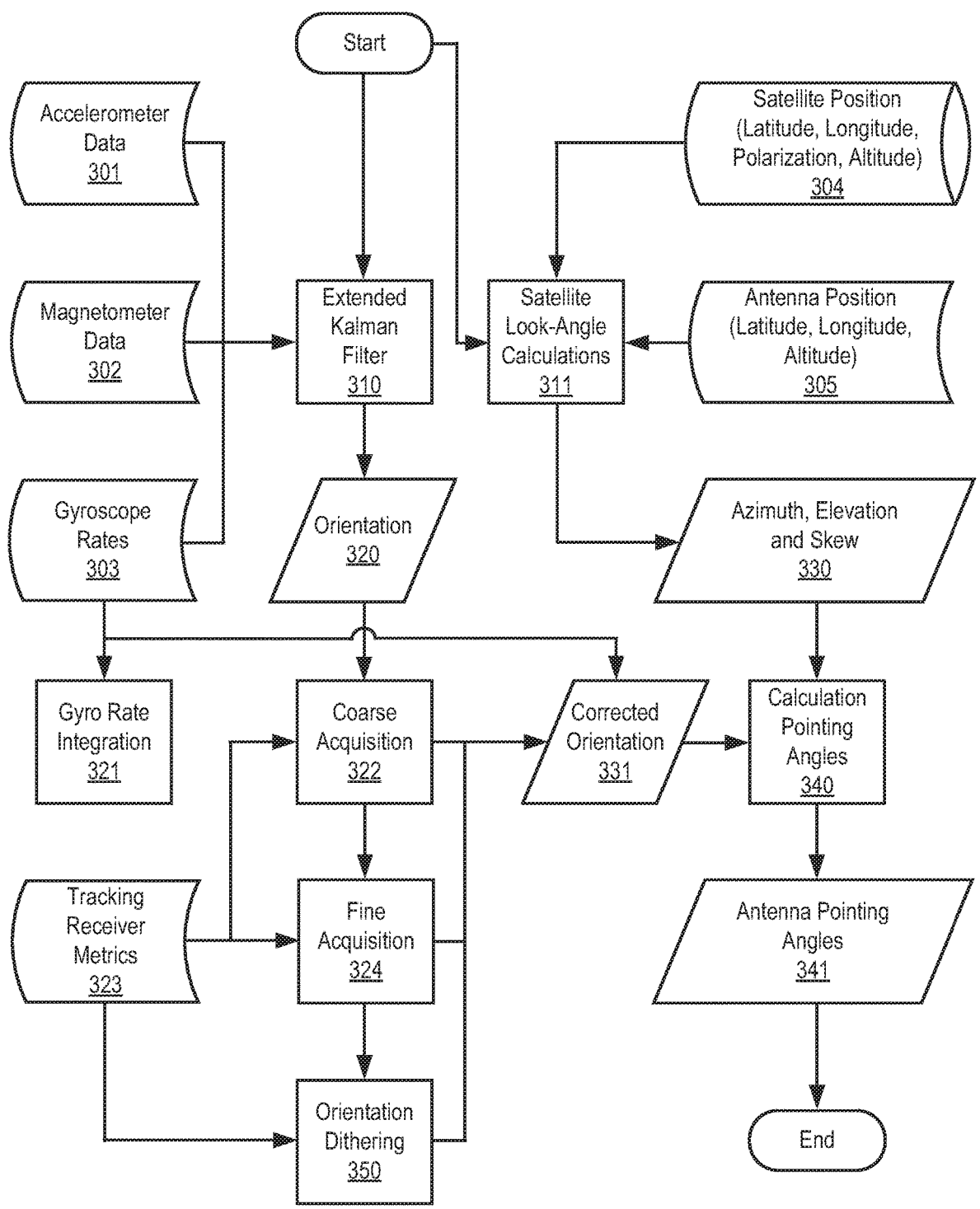
FIG. 3 is a flow diagram of one embodiment of an acquisition and dithering process performed by an antenna.

FIG. 3 is a flow diagram of one embodiment of an acquisition and dithering process performed by an antenna. Referring to FIG. 3, acceleration data 301 from accelerometers, magnetometer data 302 from magnetometers and gyroscope rates 303 from gyroscopes of the antenna are input to extended Kalman filter (EKF) 310. Based on those inputs, EKF 310 determines the initial orientation 320 of the antenna. More specifically, the accelerometers, magnetometers, and gyroscopes are sensors that may have noise and some sensitivity that cause some of their data to be less than completely accurate. That is, each of the sensors have a perceived level of correctness. In one embodiment, EKF 310 weights each of the sensors based on that perceived level of correctness and takes the weighted values of those sensors to provide orientation 320, which sets the regional uncertainty that is initially searched.

Also, the satellite position 304 and the antenna position 305 are input to satellite look-angle calculations module 311. In one embodiment, the satellite position comprises latitude longitude, longitude, polarization, and altitude, while the antenna position comprises latitude, longitude and altitude. Using the inputs, satellite look-angle calculations 311 generates data corresponding to the azimuth, elevation, and skew values 330 which are provided to the pointing angle calculations module 340.

Orientation 320 is provided to course acquisition module 322. The gyroscope rates 303 is also provided to gyrorate integration module 321, and is provided to corrected orientation 331. Gyro-rate integration 321 is used for "platform motion rejection". That is, the gyros register the rate the antenna was rotating in the last sample time. The rate times the sample time indicates how far the antenna has rotated. In one embodiment, the electronic beam is moved to compensate for this change in orientation. If the gyros were perfect, then the gyro integration could be used to remain perfectly on the satellite. However, they are not perfect, they have delay and drift. Therefore, there is a need to continue dithering to continually peak the beam. In response to the orientation and tracking receiver metrics 323, course acquisition determines corrected orientation 331. Corrected orientation 331 is input to pointing angles calculation module 340 along with the azimuth, elevation and skew values 330. In response to these inputs, pointing angle calculation module 340 generates antenna pointing angles 341 that are used to electronically steer the antenna.

Using the new antenna pointing angles 341, the antenna receives the received satellite signal at a series of points received signals from a series of points that make up a new uncertainty volume. That is, the received portion of an electronically steerable antenna receives the RF signal from the satellite from multiple directions. Course acquisition module 322 provides the initial orientation for use as orientation 331 until a hotspot is identified. Once the hotspot is identified, the corrected orientation 331 comes from fine acquisition module 324 which determines the hotspot and causes the new orientation to be provided as corrected orientation 331 to pointing angle calculation module 340 which determines the new antenna pointing angles 341.

The received signals are provided to a modem which generates tracking receiver metrics 323 that are used by fine acquisition module 324 to generate corrected. In one embodiment, tracking receiver metrics 323 comprise signal-to-noise (SNR) ratios for each of the points for which signals are being received. In another embodiment, tracking receiver metrics 323 comprise carrier-to-noise ratio (C/N) values. Course acquisition module 322 provides the initial orientation for use as orientation 331 until a hotspot is identified. Once the hotspot is identified, the corrected orientation 331 comes from fine acquisition module 324 which determines the hotspot and causes the new orientation to be provided as corrected orientation 331 to pointing angle calculation module 340 which determines the new antenna pointing angles 341.

In one embodiment, fine acquisition module 324 continues to determine corrected orientation 331 based on tracking receiver metrics (e.g., C/N values, automatic gain control (AGC) values, etc.) for use by pointing angle calculation module 340 in calculating new pointing angles 341 until the process has consistently observed the satellite signal and the maximum angle has reached its minimum value. At this point, the acquisition process is complete and orientation dithering starts. If during orientation dithering the SNR drops below a threshold, then the most recent orientation data from the extended Kalman Filter (EKF) is used as an initial starting point and the process begins again.

At which point, the process performed by the IMU is controlled by the orientation dithering module 350. Orientation dithering module 350 performs dithering using tracking receiver metric 323 in order to provide a corrected orientation 331. In one embodiment, tracker receives metric 323 used by orientation dithering module 350 comprises C/N values. As discussed in more detail below, the tracking receiver metric 323 may comprise automatic gain control (AGC) values instead of, or in addition to, C/N values, and/or other matrices.

In an alternative embodiment, instead of random patterns, other patterns can be used. For example, in other embodiments, rectangular and circular patterns can be used to search the antenna's attitude uncertainty volume to find the attitude which results in correct pointing to the satellite. In an alternative embodiment, a sky survey could be executed to construct an image of the SNR values at several different angles.

Dither Control and Processing

After acquisition, the inertial pointing and tracking system of FIG. 2 is also used for performing a dithering process to perform dither control on an antenna. In one embodiment, the inertial pointing and tracking system relies on dithering the Rx beam to correct for sensor noise and drift errors. In one embodiment of the dithering process, a sequence of intentional pointing errors is applied to the antenna while monitoring the modem carrier-to-noise (C/N) in an attempt to find (learn) the pointing angle that will provide the highest modem signal quality. This allows small offsets in pointing error caused by an imperfect IMU to be mitigated by using the reported signal quality, such as C/N, from the data modem to determine a direction in which to add small pointing adjustments to keep the beam pointed directly at the satellite.

As discussed above, the antenna may have independent transmit (Tx) and receive (Rx) beams. In one embodiment, to correct for IMU errors and produce a more accurate pointing and tracking solution for an antenna with independent Tx and Rx beams, the dither function is incorporated into the IMU algorithm. This dither function allows pointing errors to be intentionally injected into the Rx beam pointing solution to improve, and potentially optimize, the pointing solution using repetitive signal quality reports from the Rx channel as a feedback mechanism.

In one embodiment, the inertial pointing and tracking system performs dithering such that the accuracy of the roll, pitch, yaw are all improved, and potentially optimized, by the dither subsystem, which results in more accurate pointing angles. In one embodiment, the Rx aperture of the antenna performs the dither steps to identify corrections to the estimated roll, pitch, yaw, and polarization, and use them with the Tx aperture of the antenna, thereby deriving the benefit of the corrections, without incurring the incremental pointing or polarization error caused by the actual dither operations.

In one embodiment, the antenna system uses an inertial pointing and tracking system that leverages an antenna comprising separable Tx and Rx apertures that are both independently steerable, including their polarization, such as, for example, electronically steerable antenna 203 of FIG. 2. These are used in multiple ways. In one embodiment, the disposition of the antenna aperture is such that they can share a single IMU, such as IMU 201 of FIG. 2, to establish aperture orientation, which allows for additional capabilities and techniques that would not be available if each aperture had its own IMU or if each aperture were not rigidly coplanar with the other. In one embodiment, the inertial pointing and tracking system uses a single dithering subsystem that includes an Rx modem providing C/N (or other signal quality metrics) reports, to correct pointing offsets caused by imperfect IMU values, and the learned Rx offsets acquired through the dithering process can be used for the Tx aperture since its required pointing offset would be substantially similar to that of the Rx.

In one embodiment, the inertial pointing and tracking system uses a single dithering subsystem similar to the above that can dither the Rx polarization so as to acquire a correction for Rx polarization, and the learned Rx polarization correction can be used on the Tx aperture since its required polarization correction is substantially similar to that of the Rx.

In one embodiment, the inertial pointing and tracking system includes a pointing polarization dither subsystem and the pointing dither subsystem can be combined into a single system that requires only a single modem to provide signal quality reports.

In one embodiment, the inertial pointing and tracking system uses a dithering subsystem for pointing that is implemented by generating the theta/phi values (angles) from dithered roll, pitch and/or yaw values before they are applied to the antenna. They could also be implemented as small rotations in the orientation solution (e.g., roll, pitch, yaw, or their equivalent, such as a quaternion), so that dithering corrects the erroneous orientation values at their source.

In one embodiment, any manufacturing variations that cause the pointing of the Tx aperture to differ from the Rx aperture can be mitigated by calibration. The calibration can occur once at the factory, or can occur dynamically, during operation, if the transmitted signal is received and monitored by a modem at the satellite hub. This monitoring can report the signal quality of the received signal, which is an indication of a relative pointing correctness.

In one embodiment, the inertial pointing and tracking system relies on dithering the Rx beam to correct for sensor noise and drift errors. This allows the antenna to utilize very cheap IMU sensors, with larger amounts of drift than with typical systems. Specific aspects of this pointing and tracking system are described within the context of antenna described herein, which is one embodiment. The specific antenna is not a limiting factor, and can be applied to any antenna system with independently controllable Rx and Tx beams, with additional considerations for the physically separated apertures.

Rx-only Dithering

In one embodiment, a flat panel antenna contains antenna elements for a Tx aperture and antenna elements for an Rx aperture on the same surface. Because each set of elements can be driven (beam steered) independently, the Rx antenna pointing can be optimized using dither and modem feedback, while the Tx aperture can be pointed to an arbitrarily different location in space. In one embodiment, the two apertures share the same IMU, such as IMU 201 of FIG. 2. In practice, the Tx aperture is pointed to the same satellite as the Rx aperture but this characteristic allows for 3 unique capabilities, 1) any minor pointing differences between Tx and Rx can be removed through electronic calibration, 2) the learned offset acquired by the Rx aperture can be applied to the pointing commands for the Tx aperture without the application of the actual dither steps, thus eliminating the incremental Tx pointing error caused by the dither steps, and 3) any polarization differences between the Tx and Rx apertures can be corrected through electronic calibration.

There are several dependent features of Rx-dithering:

Dithering in azimuth and elevation (theta/phi);

Dithering in Yaw, Pitch, and Roll (YPR); and

Dithering polarization.

Polarization Dithering

In systems where linear polarization is used, it is necessary to match the polarization of satellite (i.e., the transmitting device) with that of the antenna (i.e., the receiving device). This is done not only to maximize the desired signals, but to minimize the potential interference to other services that are being carried on the opposite polarization.

With a perfect IMU and knowledge of the satellite antenna polarization, it is possible for a terminal to calculate the correct polarization settings for its antenna. But with an IMU orientation error, the calculated polarization will contain error also. This can be mitigated using a dither system that monitors the modem reported signal quality as the antenna polarization setting is repetitively varied between two dither values:

calculated_pol: computed from IMU value and knowledge of polarization of antenna on satellite dither steps: +d(calculated_pol), −d(calculated_pol)

learned_pol_offset=learned_pol_offset+k*(signal quality difference)

applied_RX_pol=calculated_pol+learned_pol_offset+ dither step applied_TX_pol=calculated_pol+learned_pol_offset+90 degrees In one embodiment, the difference in reported signal quality values can then be used to determine which direction a polarization correction should be applied. The system continually applies and updates the correction based on repetitively doing this sequence. The learned polarization correction can be applied to the Tx antenna (Tx will operate at the opposite (orthogonal) polarization as Rx), and the Tx antenna does not need to perform the dither steps themselves; this substantially reduces the Tx pointing error, which may be critical to meeting the FCC regulations.

Figure 4:
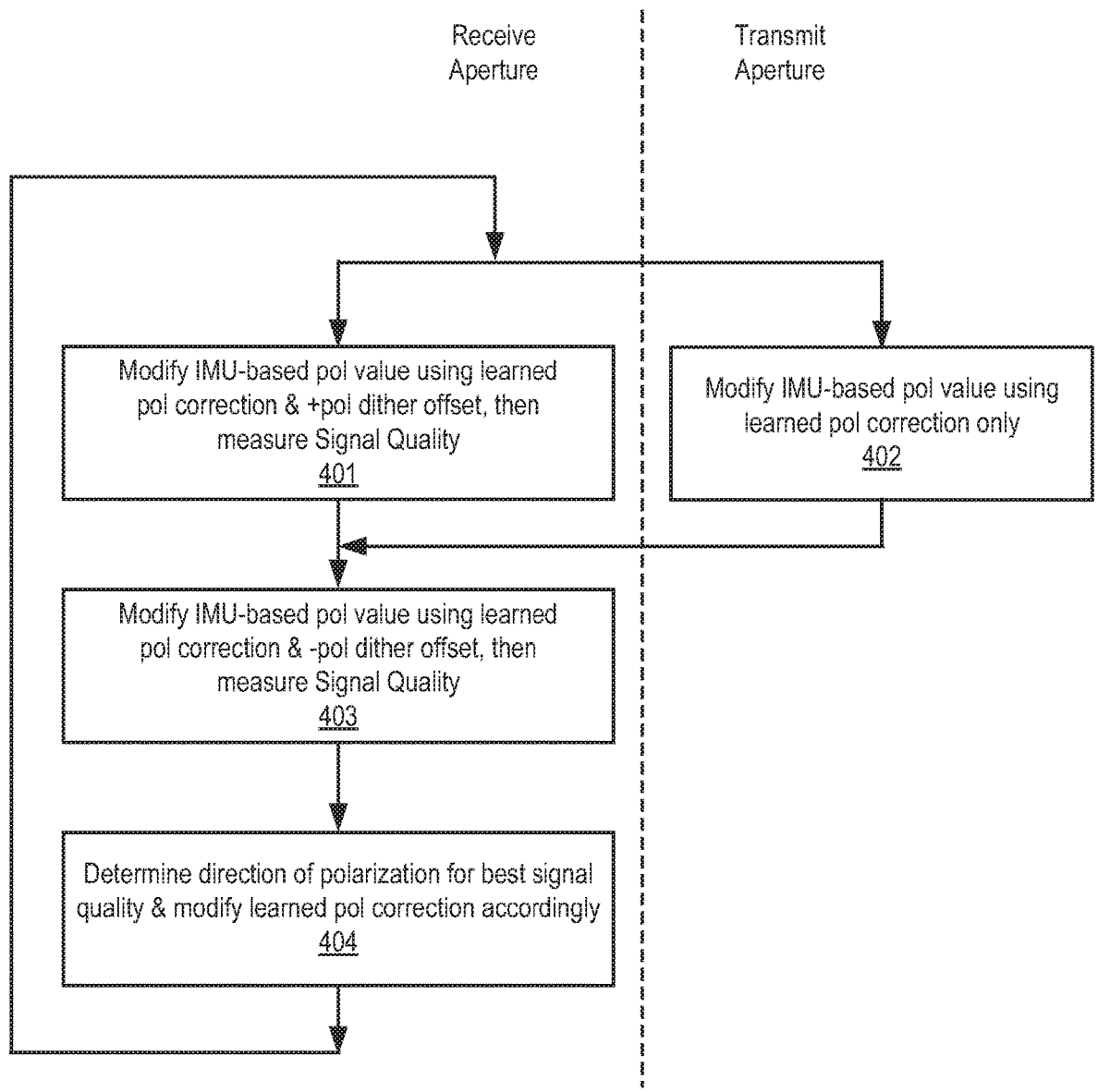
FIG. 4 is a flow diagram of one embodiment of a polarization dithering.

FIG. 4 is a flow diagram of one embodiment of a polarization dithering. The process is performed by processing logic that may comprise hardware (circuitry, dedicated logic, etc.), software (such as is run on a general purpose computer system, firmware, or a dedicated machine), or a combination of the three.

Referring to FIG. 4, the process begins by processing logic modifying IMU-based polarization value using a learned polarization correction and adding a positive polarization dither (+d (calculated_pol)) and then measuring signal quality (processing block 401). In the transmit aperture, the process also including modifying the IMU-based polarization value learned polarization correction (learned_pol_offset) only (processing block 402).

Next, after performing either processing block 401 or 402, the process transitions to processing block 403 where processing logic modifies the IMU-based polarization value using the learned polarization correction and the negative polarization dither (−d(calculated_pol)) and then measuring signal quality (processing block 403). Thereafter, processing logic determines the direction of the polarization for the best signal quality and modifies the learned polarization correction accordingly (processing block 404).

Theta/Phi Dithering

To reduce product costs, the IMU components are selected to be as inexpensive as possible, hence are likely to contribute to large pointing errors.

In an electronically steering antenna, the movement of the beam is caused by issuing a theta/phi to the antenna pattern beam generator. Applying dither steps could mean applying a theta/phi angle pair that is slightly different from the most recently IMU-computed theta/phi angle. In one embodiment, one possible dither pattern checks the signal quality at 4 points described as:

theta+$d$(theta), theta−$d$(theta), phi+$d$(phi), phi−$d$(phi).

In one embodiment, the dither offsets are based on the beam size and the amount of gain that one is willing to give up in dithering.

Figure 5A:
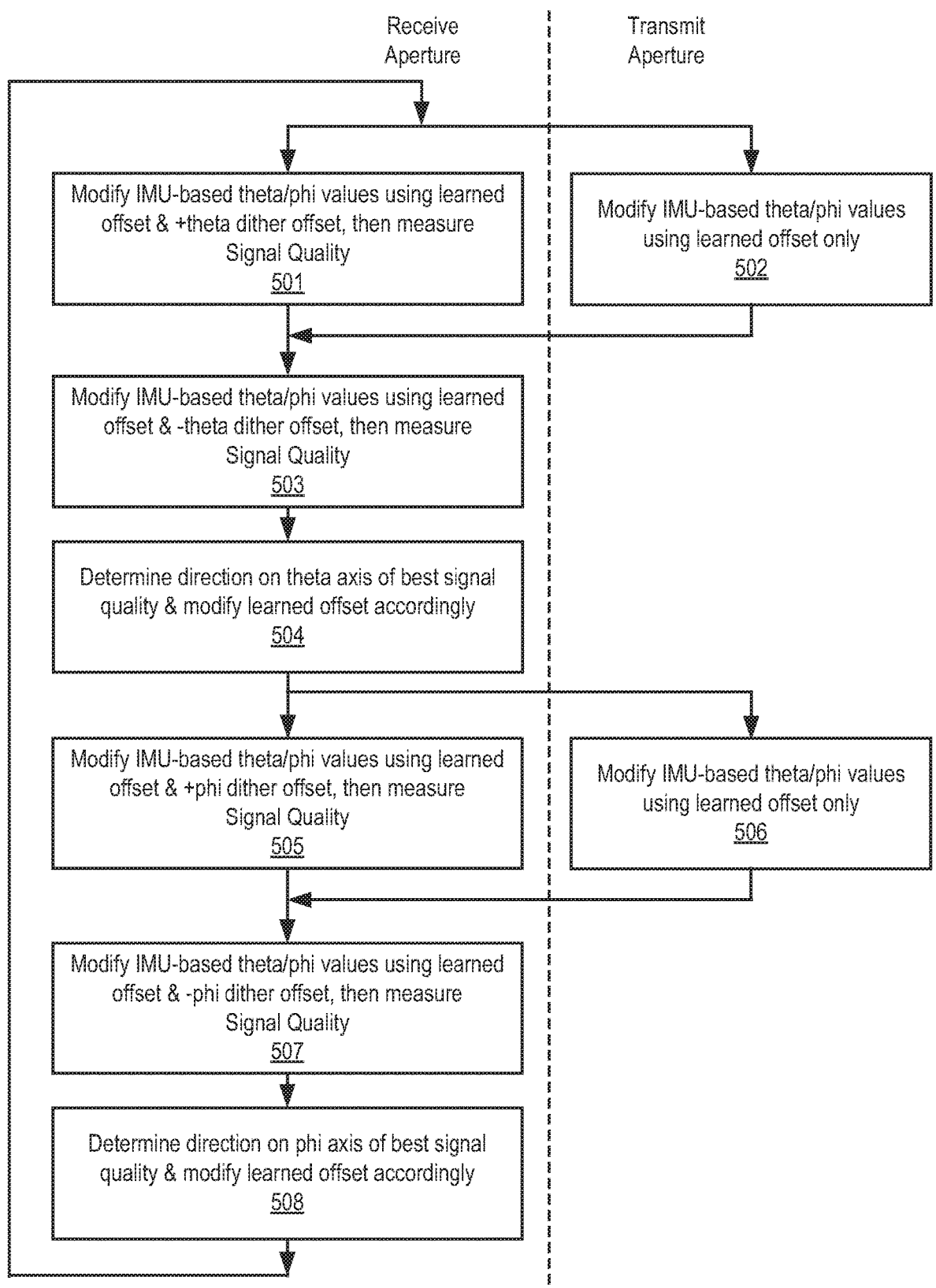
FIG. 5A is a flow diagram of one embodiment of the process for theta/phi dithering.

FIG. 5A is a flow diagram of one embodiment of the process for theta/phi dithering. The process is performed by processing logic that may comprise hardware (circuitry, dedicated logic, etc.), software (such as is run on a general purpose computer system or a dedicated machine), firmware or a combination of the three.

Referring to FIG. 5A, the processing begins by processing logic for the receive antenna modifying IMU-based theta/phi values using a learned offset and the +theta dither offset and then measuring signal quality based on those values (processing block 501). In one embodiment, the learned offset may have come from previous tracking. It might also be generated during installation, particularly in cases where metal around the installation site is distorting the magnetic compass, for example. Similarly, for the transmit aperture, processing logic modifies the IMU-based theta/phi value using the learned offset only (processing block 502).

Thereafter, processing transitions from both processing blocks 501 and 502 to processing block 503 where processing logic for the receive aperture modifies the IMU-based theta/phi values using the learned offset and the −theta dither offset and then measures the signal quality (processing block 503). Then processing logic determines a direction the theta axis of best signal quality and modifies the learned offset accordingly (processing block 504).

After determining the direction of the theta axis and modifying the learned offset accordingly, processing logic transitions to processing block 505 and 506. At processing block 505, processing logic for the receive aperture modifies the IMU-based theta/phi values using the learned offset and the +phi dither offset and then measures signal quality, while at processing block 506, processing logic for the transmit aperture modifies the IMU-based theta/phi values using the learned offset only.

After performing either processing block 505 or 506, the process transitions to processing block 507 where processing logic modifies the IMU-based theta/phi values using the learned offset and the −phi dither offset and then measures signal quality. Then processing logic for the receive aperture determines the direction of the phi axis of best signal quality and modifies the learned offset accordingly (processing block 508).

Figure 5B:
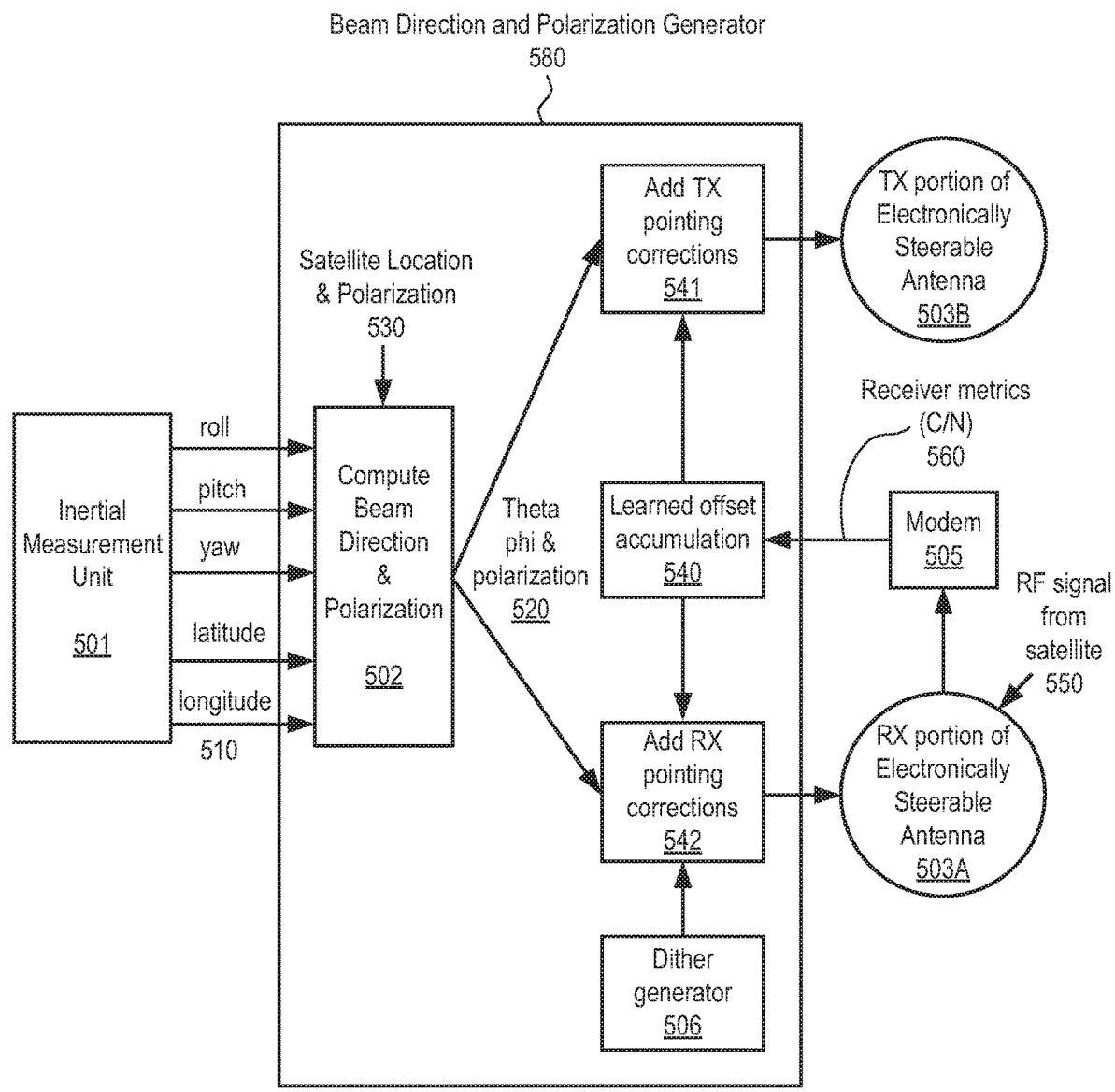
FIG. 5B illustrates one embodiment of an antenna controller of an antenna.

FIG. 5B illustrates one embodiment of antenna system that performs dithering. Referring to FIG. 5B, an inertial measurement unit 501 generates a number of values (IMU) 510 that are received by the beam direction and polarization computation unit 502. In one embodiment, values 510 comprise roll, pitch, yaw, location information (e.g., latitude and longitude). Beam direction and polarization computation 502 also receives satellite location (e.g., latitude and longitude) and polarization. In response to these inputs, beam direction and polarization computation unit 502 generates theta, phi and polarization values 520 that are provided to and control the electronically steerable antenna 503. For example, theta range may be [0,90] degrees, phi range may be [0,360] degrees, and the polarization range may be [0,360] degrees.

Theta, phi and polarization values 520 are input to transmit pointing correction unit 541 and receive pointing correction unit 542. Receive correction unit 542 also receives a dither or offset from dither generator 506 and a learned offset from learned offset accumulation unit 540. In response to these inputs, receive pointing correction unit 542, generates an antenna pointing angle that is provided to the receive portion of the electronically steerable antenna 503A.

Similarly, the transmit pointing correction unit 541 also receives the learned offset from the learned offset accumulation unit 540 and uses it in conjunction with the theta, phi and polarization values 520 to generate an antenna pointing angle for the transmit portion of the electronically steerable antenna 503B.

The receive portion of the electronically steerable antenna 503A using the new pointing angle to obtain an RF signal from the satellite 550 and provide it to modem 505. In response, modem 505 generates receive metrics 560 (e.g., C/N) and provides them to learned offset accumulation unit 540. In one embodiment, the tracking receiver metric output for modem 505 is a C/N value 560 that is sent to accumulated at the learned offset accumulation unit 540 to provide a learned offset for use by both the transmit pointing correction unit 541 and receive pointing correction units.

Orientation Dithering

When the learned theta/phi offset becomes very large due to substantial errors in the IMU solution, it is no longer possible to reject platform motion with the IMU. The problem is created because the coordinate system that the IMU is working in (e.g., roll, pitch, yaw) is different than the coordinate system the beam pointing is in (e.g., theta/phi space or equivalently azimuth/elevation space).

In one embodiment, the dither is applied in the same coordinate system as the source of the errors. To accomplish this, the dither is applied as small rotations in roll, pitch and yaw. In one embodiment, instead of rotating around the yaw pitch roll axes, a rotation axes is chosen such that it will effect polarization only, or theta/phi only, so as to separate pointing dithering from polarization dithering. In another embodiment, axes that separate theta from phi is chosen. In yet another embodiment, the tracking system rotates a small angle in the positive roll direction, calculates antenna pointing from this dithered orientation, and measures signal quality. Then this is repeated for the negative roll direction. A correction rotation is then applied to the orientation solution in the direction of increasing signal quality. This process is repeated for the roll and pitch axis. With the orientation solution itself corrected, there is no need to keep a record of the adjustment itself, and only the improved attitude estimate is maintained. This is shown in FIG. 3 of this section.

Figure 6A:
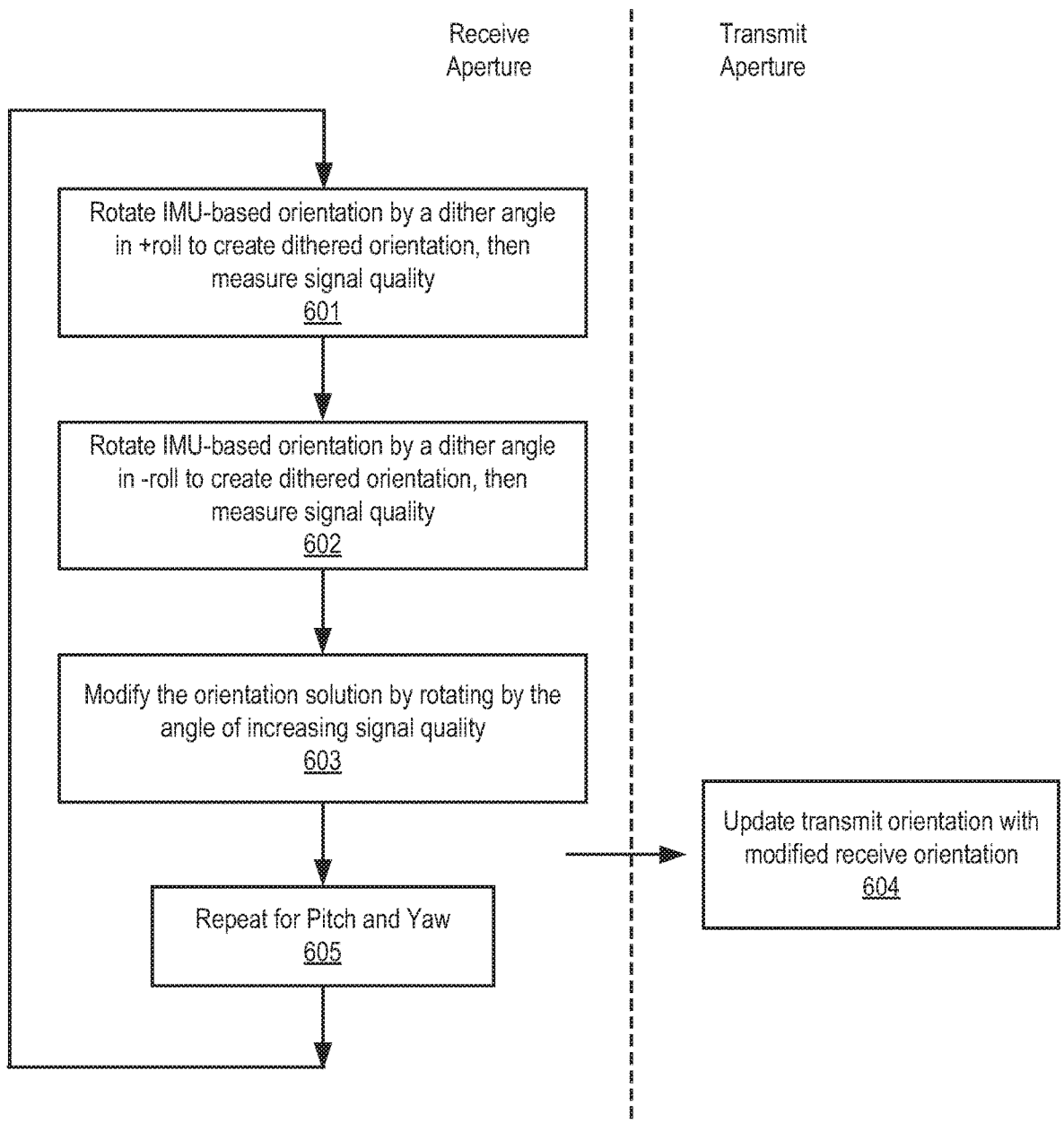
FIG. 6A is a flow diagram of one embodiment of the process for performing orientation correction.

FIG. 6A is a flow diagram of one embodiment of the process for performing orientation correction. The process is performed by processing logic that may comprise hardware (circuitry, dedicated logic, etc.), software (such as is run on a general purpose computer system or a dedicated machine), firmware or a combination of the three.

Referring to FIG. 6A, the processing begins by processing logic for the receive aperture rotating the IMU-based orientation by a dither angle in +roll offset to create a dithered orientation and then measuring the signal quality (processing block 601).

Next, processing logic for the receive aperture rotates the IMU-based orientation by dither angle in −roll offset to create a dithered orientation and then measures the signal quality (processing block 602). Lastly, for the receive aperture, processing logic modifies the orientation solution by rotating the orientation by the angle of increasing signal quality (processing block 603) and then processing logic repeats these operations for the pitch and yaw, and repeats the process (processing block 605).

Also, in the transmit aperture, after processing blocks 601 and 62, processing logic updates the transmit orientation with the modified receive orientation (processing block 604).

Figure 6B:
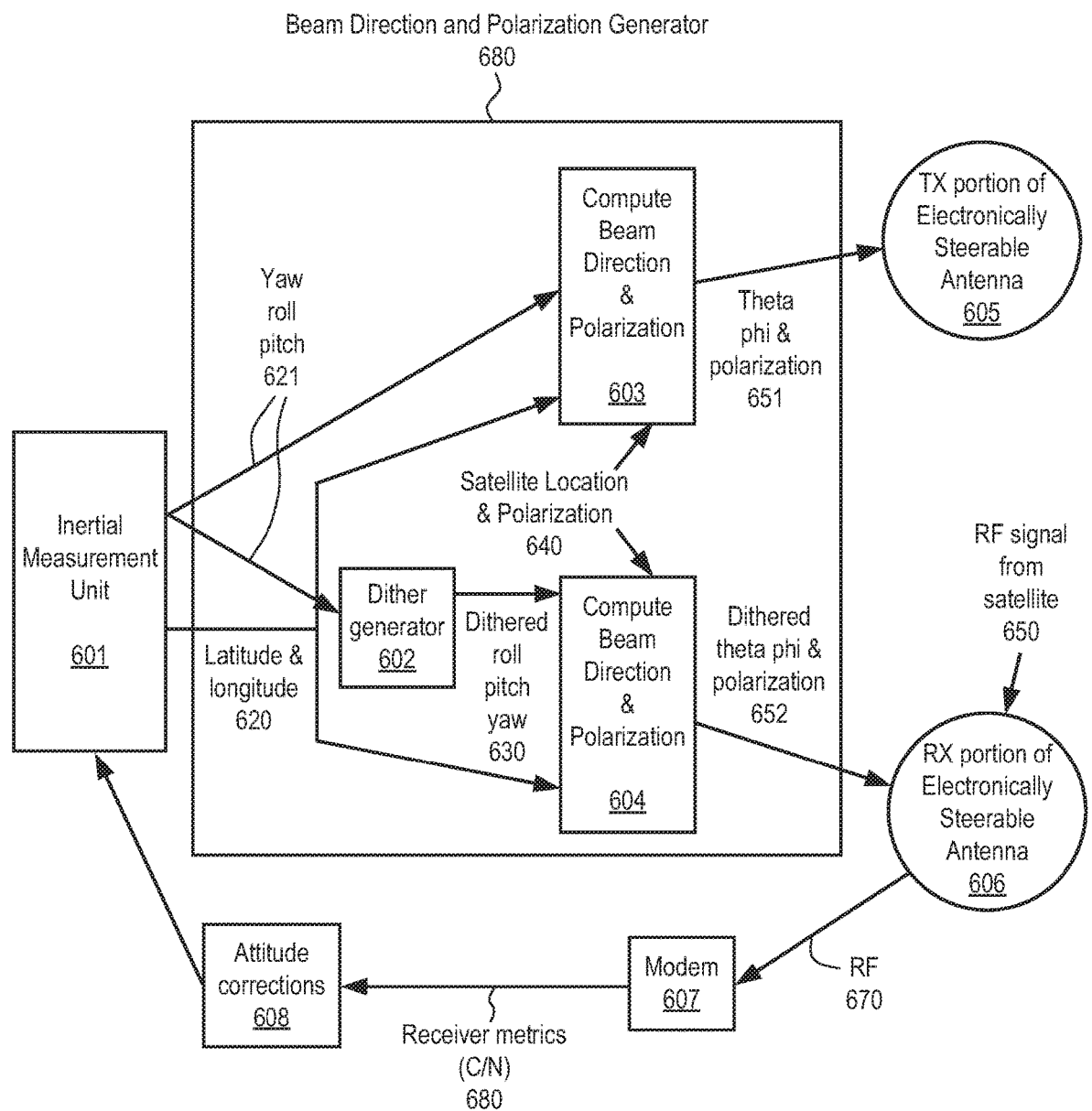
FIG. 6B illustrates one embodiment of a data flow diagram of the orientation correction performed by the antenna.

FIG. 6B illustrates one embodiment of a data flow diagram of the orientation correction performed by the antenna. Referring to FIG. 6B, the inertial measurement unit (IMU) 601 provides yaw, roll and pitch values 621 to a beam direction and polarization computation unit 603 and dither generator 602, which are part of a beam direction and polarization generates 680. IMU 601 also provides latitude and longitude information 620 to beam direction and polarization computation unis 603 and 604.

In response to the yaw, roll, and pitch values 621, dither generator 602 generates dithered roll, pitch and yaw values 630 and provides those values to beam direction and polarization computation unit 604.

In response to the longitude and latitude information 620 and the dithered, roll, pitch and yaw value 630, beam direction and polarization unit 604 generates a dithered theta, phi and polarization value 652 and provides those to the receive portion of the electronically steerable antenna 606. Similarly, in response to the longitude and latitude information 620 and yaw, roll, and pitch value 621, beam direction polarization computation unit 603 and satellite location polarization value 640, beam direction and polarization unit 603 generates theta, phi and polarization values 651 and provides those to the transmit portion of the electronically steerable antenna 605.

Using the dithered data, phi and polarization values 652, the receive portion of the electronically steerable antenna 606 receives an RF signal from a satellite 650 and provides received RF signal 670 to modem 607. In response to RF signal 670, modem 607 generates tracking receiver metric that are sent to attitude correction unit 608. In one embodiment, the one or more tracking receiver metrics comprise C/N values 680 in response to C/N value 680 attitude correction unit 608, generates attitude corrections and provides those to IMU 601 for the next iteration of the unit orientation correction.

Tx-Rx Offsets

In some applications, the Tx and Rx apertures of a single antenna may point to different locations. For example, an Rx beam may be directed to a satellite at the orbital slot 100W (for example) and Tx aperture may be directed to the satellite at orbital slot 102W (for example). If the antenna uses a common IMU to derive orientation information and the Rx aperture uses a dither subsystem to substantially eliminate pointing errors caused by the imperfections of that IMU, then the learned offset acquired by the Rx aperture can be used to adjust the Tx aperture pointing parameters, including polarization, thereby substantially minimizing the Tx errors.

Exemplary Dither Flow Diagrams

FIG. 7 is a flow diagram of one embodiment of a dithering process. The process is performed by processing logic that may comprise hardware (e.g., circuitry, dedicated logic, etc.), software (such as is run on a general purpose computer system or a dedicated machine), firmware, or a combination of the three.

Referring to FIG. 7, the process begins by processing logic perturbing one or more of roll, pitch and yaw angles of an antenna orientation to create variant orientations associated with a first search pattern (processing block 701). In one embodiment, the first search pattern is a random pattern. In one embodiment, the first search (and subsequent search patterns) are a circular pattern. In one embodiment, the first (and subsequent search patterns) patterns comprise noncontiguous points in the sky.

After perturbing one or more of roll, pitch and yaw angles, processing logic computes new scan and polarization angles, in response to perturbed roll, pitch and yaw angles, for each of the variant orientations (processing block 702).

Using the new scan and polarization angles, processing logic receives a radio-frequency (RF) signal from a satellite for each of the variant orientations (processing block 703) and generates one or more receiver metrics representing a received RF signal associated with each of the variant orientations (processing block 704). In one embodiment, the RF signal from the satellite is received without physically moving an aperture of the antenna. In one embodiment, the one or more signal metrics comprises Carrier-to-Noise Ratio (C/N). Other metrics that may be used, including, but not limited to, Es/No or Eb/No. In one embodiment, during dithering, the base orientation is not visited by the Rx antenna.

Based on the one or more receiver metrics, processing logic selects, as a new orientation, one of the variant orientation (processing block 705) and repeats the process above with the new orientation with a second search pattern narrower than the first search pattern (processing block 706). In one embodiment, the process is repeated until a consistently observed satellite signal is received. In one embodiment, the variance of the search pattern after a good signal has been observed is decreased. In one embodiment, the second search pattern has a maximum angle that is decreased in comparison with that of the first search pattern. In one embodiment, this process of decreasing the maximum angle for each new search pattern used when repeating the process is used until a consistently observed satellite signal is received.

Once a consistently observed satellite signal has been observed, processing logic generates an offset based on the one or more receiver metrics (e.g., C/N), adds pointing corrections to one or more of the scan and polarization angles (e.g., adding receive pointing corrections to receive scan and polarization angles and adding transmit pointing corrections to transmit scan and polarization angles), and applies scan and polarization angles with pointing corrections to an electronically steerable antenna (e.g., applying the receive scan and polarization angles with pointing corrections to a receive portion of the electronically steerable antenna and applying the transmit scan and polarization angles with pointing corrections to a transmit portion of an electronically steerable antenna) (processing block 707).

In one embodiment, adding pointing corrections to the scan and polarization angles comprises one or more of: applying dithering to scan angles prior to applying the scan angles to an antenna; and applying dithering to polarization angle prior to applying the polarization angle to an antenna.

FIG. 8 is a flow diagram of another embodiment of the dithering process. The process is performed by processing logic that may comprise hardware (e.g., circuitry, dedicated logic, etc.), software (such as is run on a general purpose computer system or a dedicated machine), firmware, or a combination of the three.

Referring to FIG. 8, the process begins by processing logic perturbing one or more of roll, pitch and yaw angles of an antenna orientation to create variant orientations associated with a first search pattern by applying one or more attitude corrections to the roll, pitch and yaw angles of an antenna orientation based on the one or more receiver metrics (processing block 801). In one embodiment, the first search pattern is a random pattern. In one embodiment, the first search (and subsequent search patterns) are a circular pattern. In one embodiment, the first (and subsequent search patterns) patterns comprise noncontiguous points in the sky.

Next, processing logic dithers one or more of the roll, pitch and yaw angles after applying the one or more attitude corrections, such that the new scan and polarization angles can be computed in response to the perturbed roll, pitch and yaw angles comprise dithered scan and polarization angles (processing block 802).

After perturbing one or more of roll, pitch and yaw angles and performing any dithering of such angles, processing logic computes new scan and polarization angles, in response to perturbed roll, pitch and yaw angles, for each of the variant orientations (processing block 803).

Using the new scan and polarization angles, processing logic receives an radio-frequency (RF) signal from a satellite for each of the variant orientations (processing block 804) and generates one or more receiver metrics representing a received RF signal associated with each of the variant orientations (processing block 805). In one embodiment, the RF signal from the satellite is received without physically moving an aperture of the antenna. In one embodiment, the one or more signal metrics comprises Carrier-to-Noise Ratio (C/N).

Based on the one or more receiver metrics, processing logic selects, as a new orientation, one of the variant orientation along with the attitude corrections for the new orientation (processing block 806) and repeats the process above with the new orientation with a second search pattern narrower than the first search pattern (processing block 807). For orientation dithering, the attitude corrections block generates roll, pitch, and yaw corrections for all the orientations that are going to part of the next round of searching. In one embodiment, the process is repeated until a consistently observed satellite signal is received. In one embodiment, the variance of the search pattern after a good signal has been observed is decreased. In one embodiment, the second search pattern has a maximum angle that is decreased in comparison with that of the first search pattern. In one embodiment, this process of decreasing the maximum angle for each new search pattern used when repeating the process is used until a consistently observed satellite signal is received.

Examples of Antenna Embodiments

The techniques described above may be used with flat panel antennas that are electronically steerable. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings. Note that the techniques described herein are applicable to other antennas, not solely those that are electronically steerable.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Overview of an Example of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Examples of Wave Guiding Structures

Figure 9:
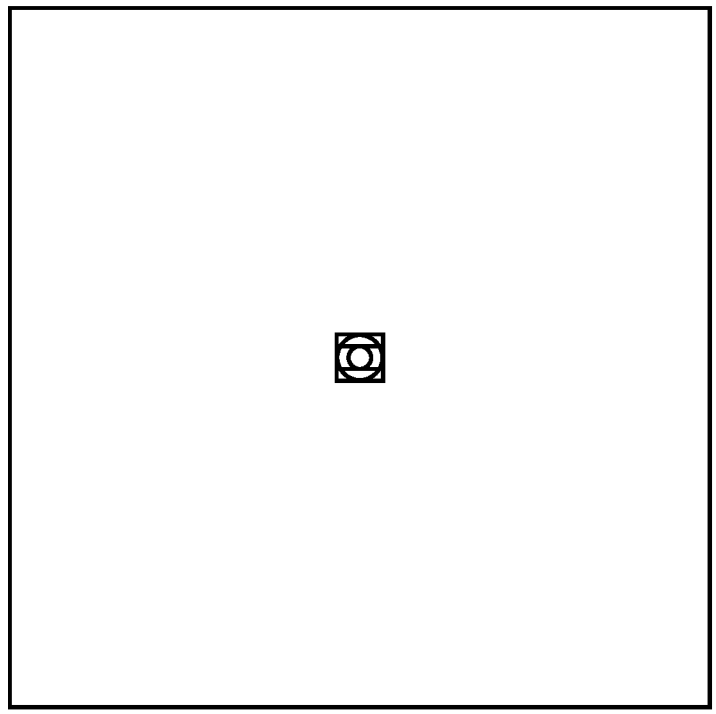
FIG. 9 illustrates a top view of one embodiment of a coaxial feed that is used to provide a cylindrical wave feed.

FIG. 9 illustrates a top view of one embodiment of a coaxial feed that is used to provide a cylindrical wave feed. Referring to FIG. 9, the coaxial feed includes a center conductor and an outer conductor. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

Figure 10:
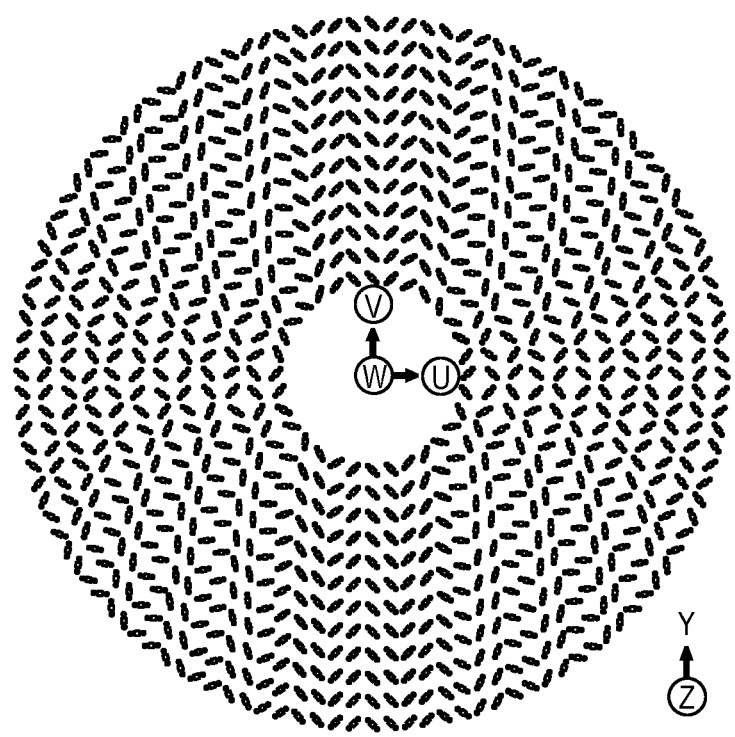
FIG. 10 illustrates an aperture having one or more arrays of antenna elements placed in concentric rings around an input feed of the cylindrically fed antenna.

FIG. 10 illustrates an aperture having one or more arrays of antenna elements placed in concentric rings around an input feed of the cylindrically fed antenna.

Antenna Elements

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty five degree)(45° angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 11:
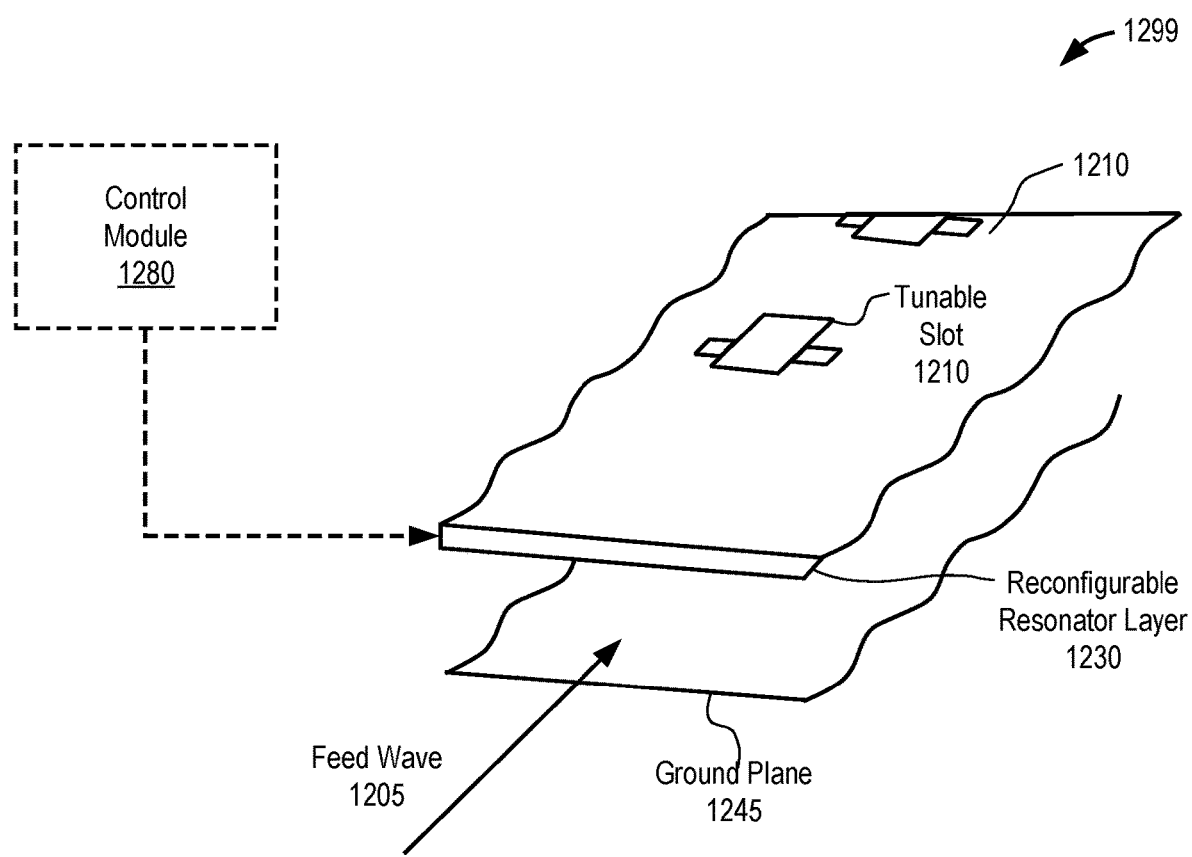
FIG. 11 illustrates a perspective view of one row of antenna elements that includes a ground plane and a reconfigurable resonator layer.

FIG. 11 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Control module 1280 is coupled to reconfigurable resonator layer 1230 to modulate the array of tunable slots 1210 by varying the voltage across the liquid crystal in FIG. 11. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w^*_{in}w_{out}$, with $w_{in}$ as the wave equation in the waveguide and $w_{out}$ the wave equation on the outgoing wave.

Figure 12:
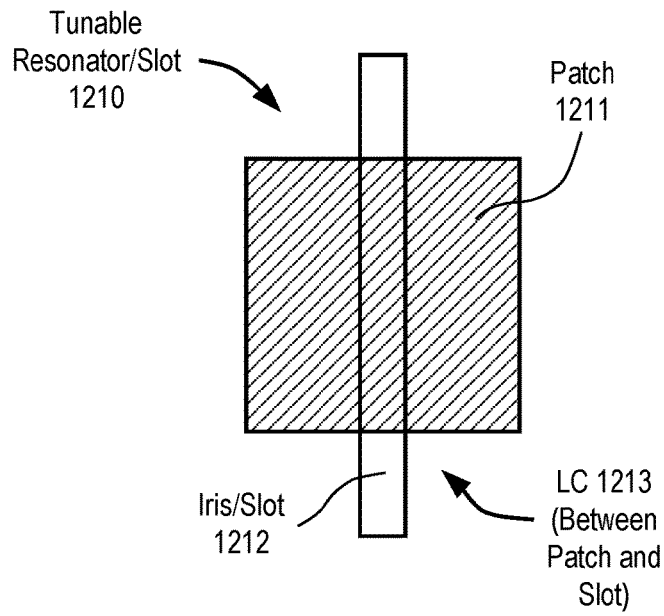
FIG. 12 illustrates one embodiment of a tunable resonator/slot.

FIG. 12 illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 13:
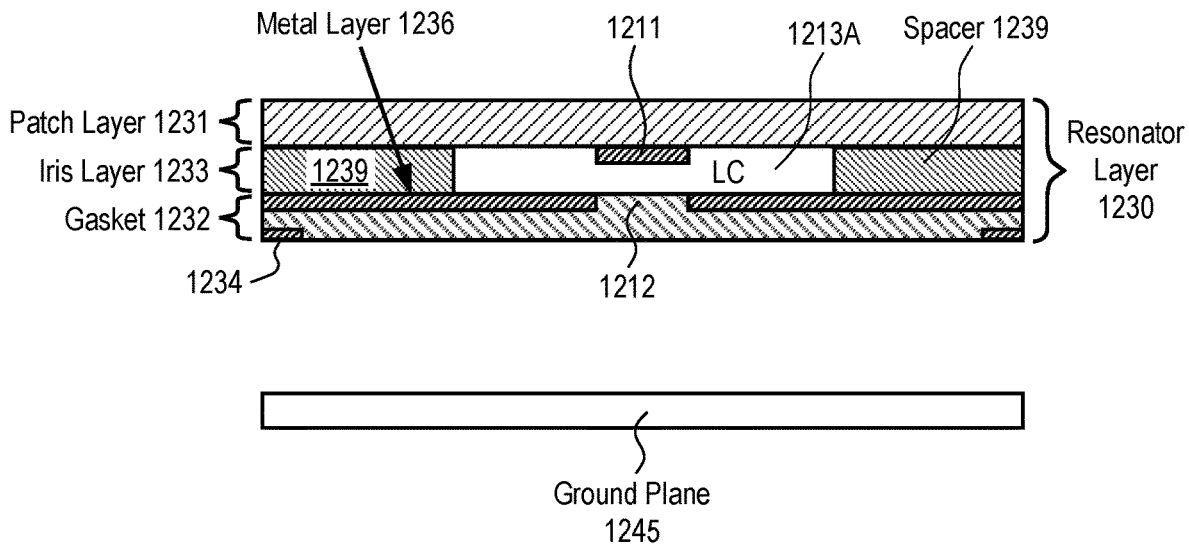
FIG. 13 illustrates a cross section view of one embodiment of a physical antenna aperture.

FIG. 13 illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 13 includes a plurality of tunable resonator/slots 1210 of FIG. 12. Iris/slot 1212 is defined by openings in metal layer 1236. A feed wave, such as feed wave 1205 of FIG. 11, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed below patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 13. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 13 includes multiple tunable resonator/slots, such as tunable resonator/slot 1210 includes patch 1211, liquid crystal 1213, and iris 1212 of FIG. 12. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIG. 14A-D illustrate one embodiment of the different layers for creating the slotted array. The antenna array includes antenna elements that are positioned in rings, such as the example rings shown in FIG. 10. Note that in this example the antenna array has two different types of antenna elements that are used for two different types of frequency bands.

Figure 14A:
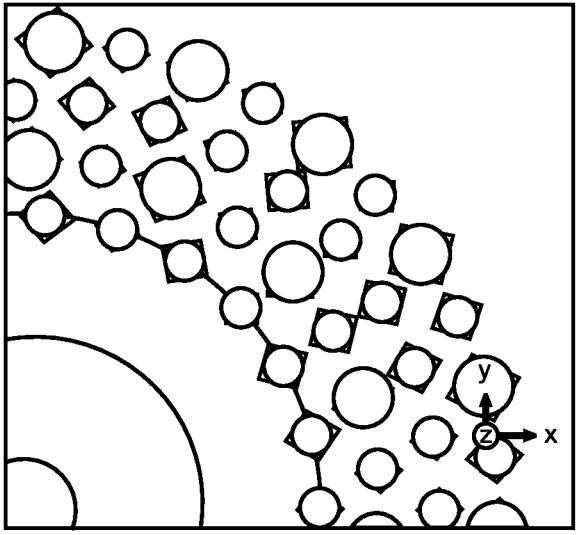
FIG. 14A-D illustrate one embodiment of the different layers for creating the slotted array.
Figure 14B:
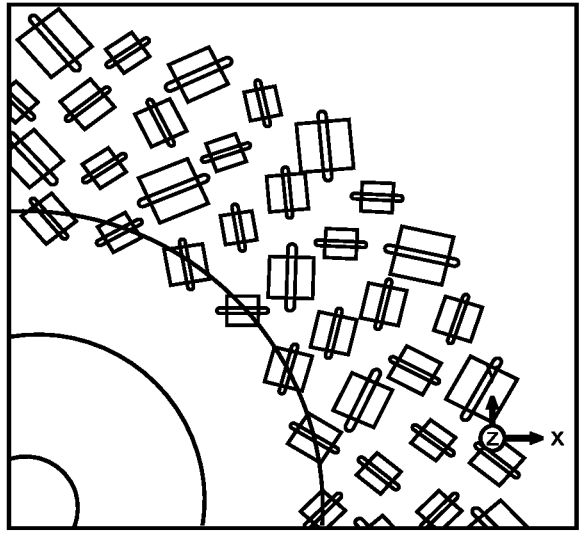
Figure 14C:
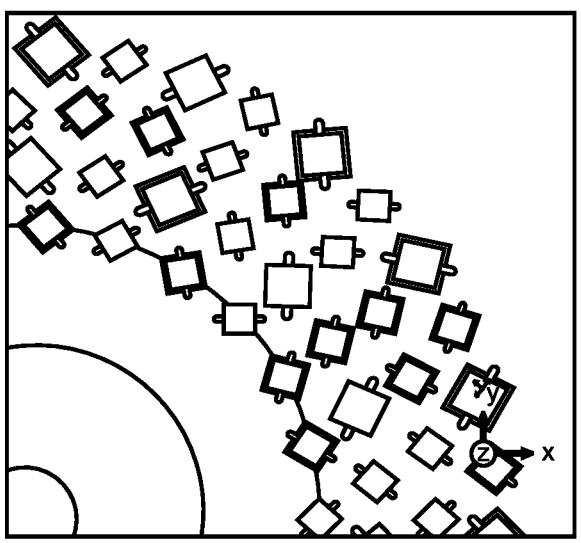
Figure 14D:
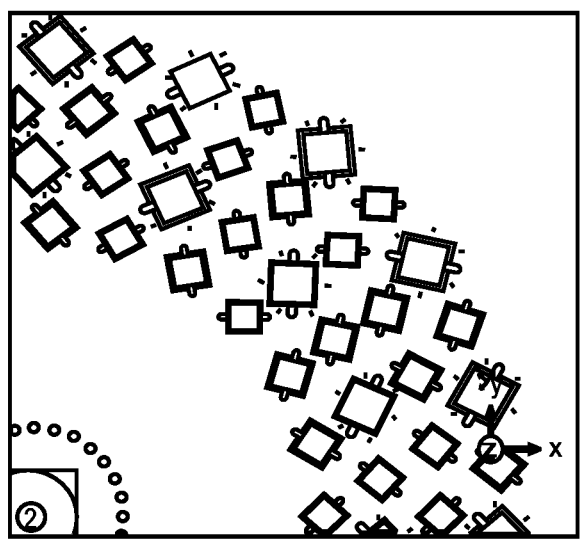

FIG. 14A illustrates a portion of the first iris board layer with locations corresponding to the slots. Referring to FIG. 14A, the circles are open areas/slots in the metallization in the bottom side of the iris substrate, and are for controlling the coupling of elements to the feed (the feed wave). Note that this layer is an optional layer and is not used in all designs. FIG. 14B illustrates a portion of the second iris board layer containing slots. FIG. 14C illustrates patches over a portion of the second iris board layer. FIG. 14D illustrates a top view of a portion of the slotted array.

Figure 15:
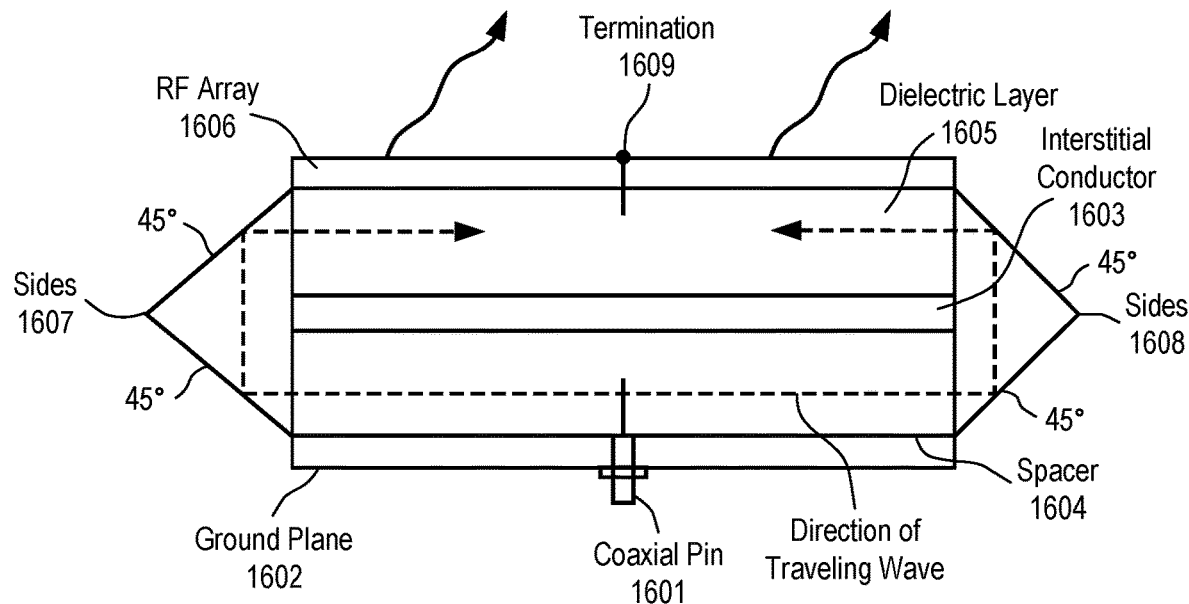
FIG. 15 illustrates a side view of one embodiment of a cylindrically fed antenna structure.

FIG. 15 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 15 includes the coaxial feed of FIG. 9.

Referring to FIG. 15, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 203 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 15 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 16:
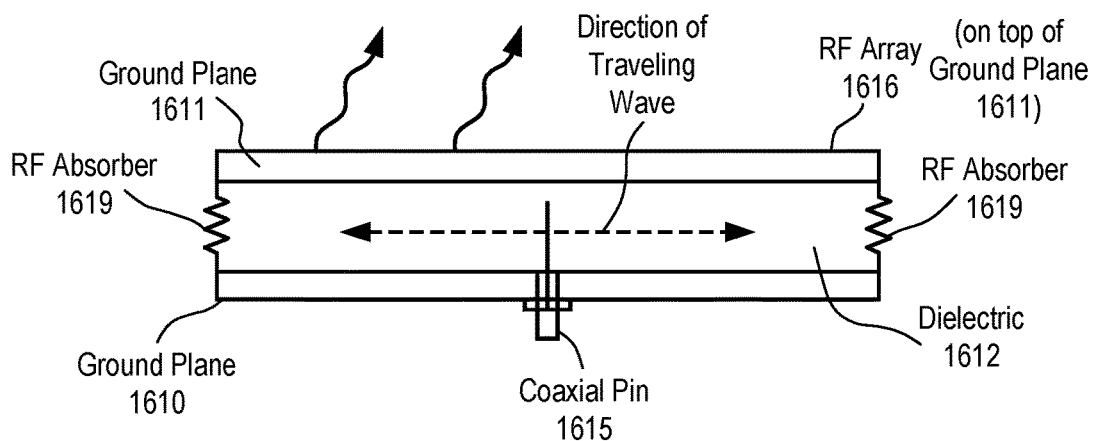
FIG. 16 illustrates another embodiment of the antenna system with an outgoing wave.

FIG. 16 illustrates another embodiment of the antenna system with an outgoing wave. Referring to FIG. 16, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 5052) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 15 and 16 improves the service angle of the antenna. Instead of a service angle of plus or minus forty five degrees azimuth (±45° Az) and plus or minus twenty five degrees elevation (±25° El), in one embodiment, the antenna system has a service angle of seventy five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 15 and RF array 1616 of FIG. 16 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 17:
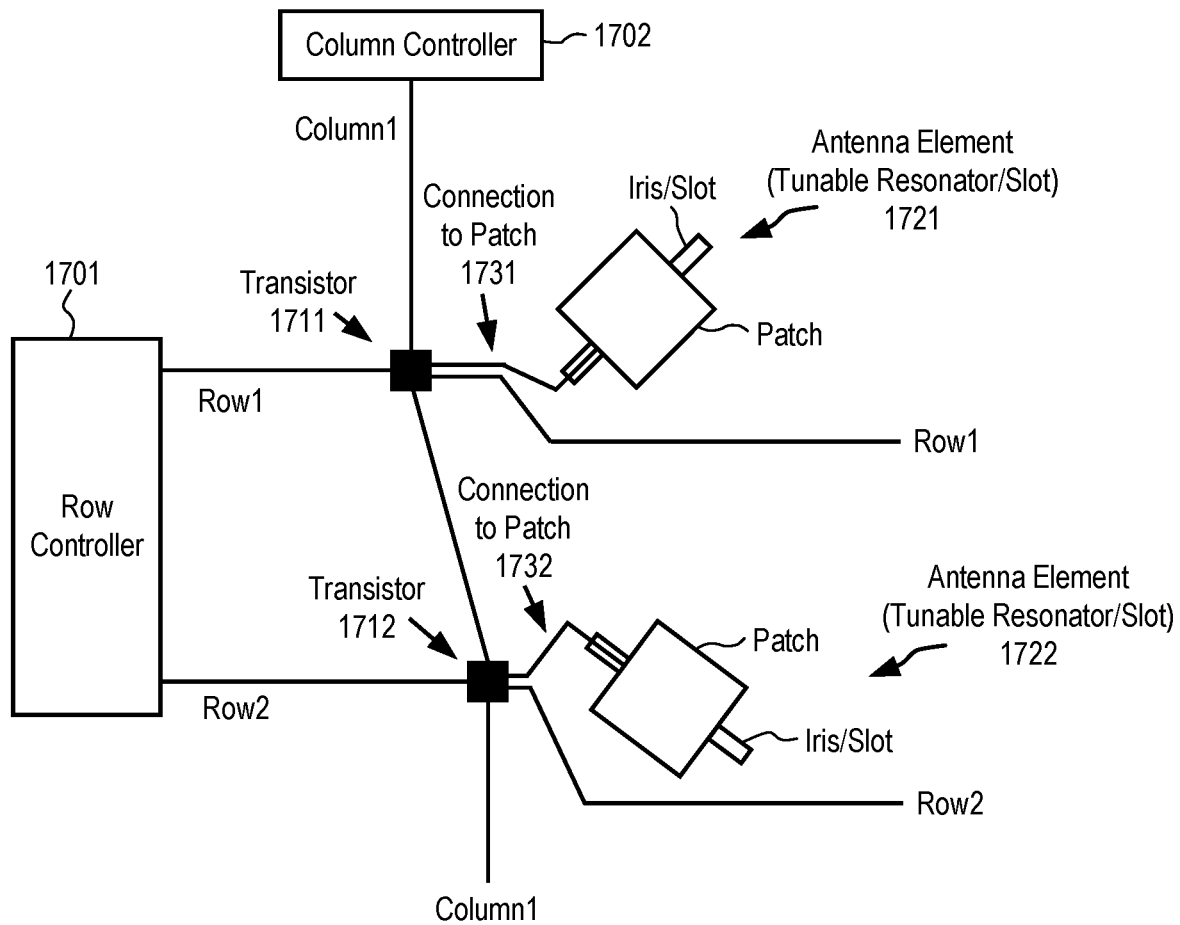
FIG. 17 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 17 illustrates one embodiment of the placement of matrix drive circuitry with respect to antenna elements. Referring to FIG. 17, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 18:
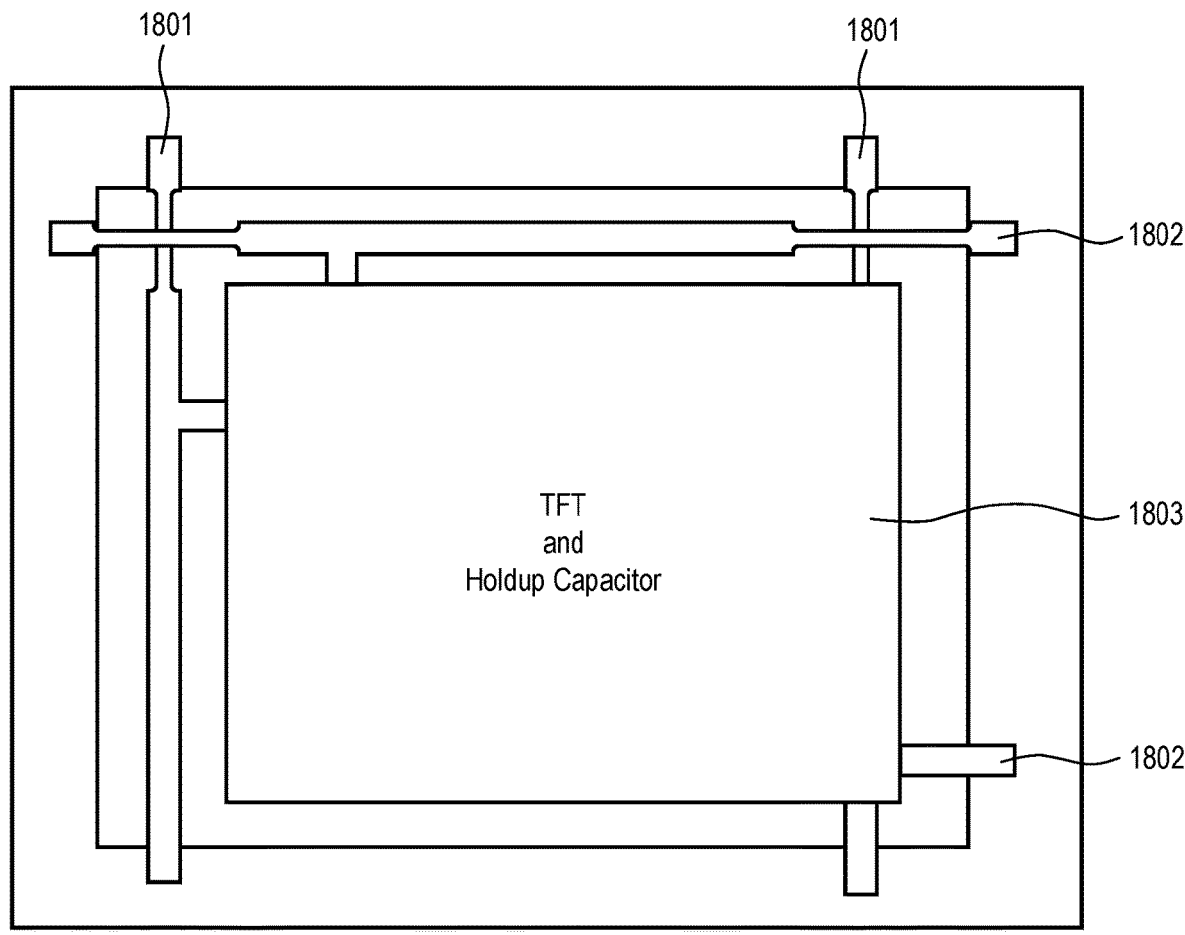
FIG. 18 illustrates one embodiment of a TFT package.

In one embodiment, a TFT package is used to enable placement and unique addressing in the matrix drive. FIG. 18 illustrates one embodiment of a TFT package. Referring to FIG. 18, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example System Embodiment

In one embodiment, the combined antenna apertures are used in a television system that operates in conjunction with a set top box. For example, in the case of a dual reception antenna, satellite signals received by the antenna are provided to a set top box (e.g., a DirecTV receiver) of a television system. More specifically, the combined antenna operation is able to simultaneously receive RF signals at two different frequencies and/or polarizations. That is, one sub-array of elements is controlled to receive RF signals at one frequency and/or polarization, while another sub-array is controlled to receive signals at another, different frequency and/or polarization. These differences in frequency or polarization represent different channels being received by the television system. Similarly, the two antenna arrays can be controlled for two different beam positions to receive channels from two different locations (e.g., two different satellites) to simultaneously receive multiple channels.

Figure 19:
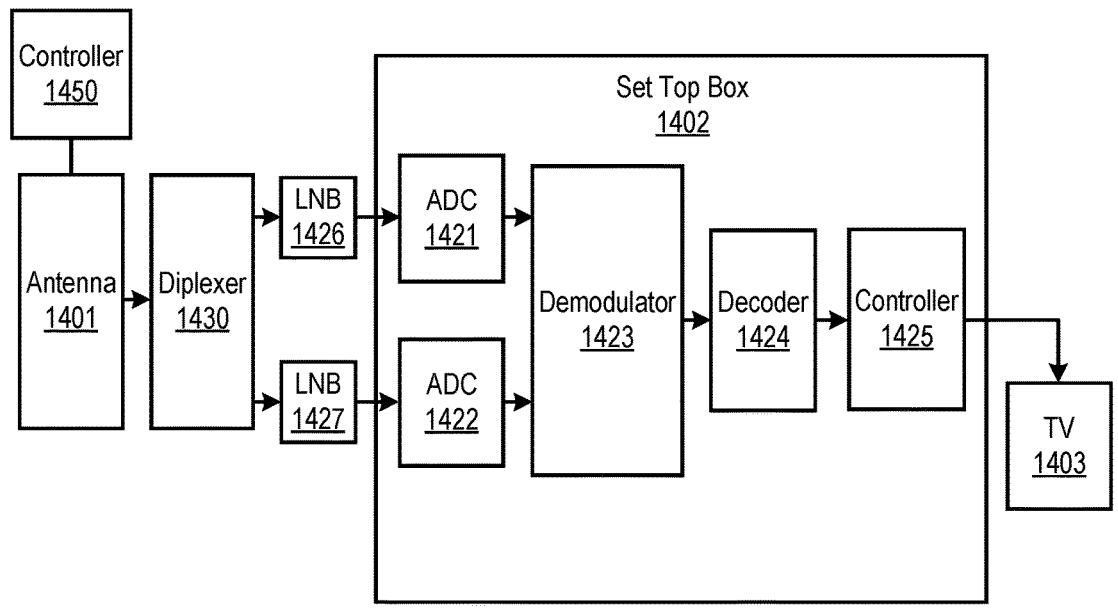
FIG. 19 is a block diagram of one embodiment of a communication system that performs dual reception simultaneously in a television system.

FIG. 19 is a block diagram of one embodiment of a communication system that performs dual reception simultaneously in a television system. Referring to FIG. 19, antenna 1401 includes two spatially interleaved antenna apertures operable independently to perform dual reception simultaneously at different frequencies and/or polarizations as described above. Note that while only two spatially interleaved antenna operations are mentioned, the TV system may have more than two antenna apertures (e.g., 3, 4, 5, etc. antenna apertures).

In one embodiment, antenna 1401, including its two interleaved slotted arrays, is coupled to diplexer 1430. The coupling may include one or more feeding networks that receive the signals from elements of the two slotted arrays to produce two signals that are fed into diplexer 1430. In one embodiment, diplexer 1430 is a commercially available diplexer (e.g., model PB1081WA Ku-band sitcom diplexor from A1 Microwave).

Diplexer 1430 is coupled to a pair of low noise block down converters (LNBs) 1426 and 1427, which perform a noise filtering function, a down conversion function, and amplification in a manner well-known in the art. In one embodiment, LNBs 1426 and 1427 are in an out-door unit (ODU). In another embodiment, LNBs 1426 and 1427 are integrated into the antenna apparatus. LNBs 1426 and 1427 are coupled to a set top box 1402, which is coupled to television 1403.

Set top box 1402 includes a pair of analog-to-digital converters (ADCs) 1421 and 1422, which are coupled to LNBs 1426 and 1427, to convert the two signals output from diplexer 1430 into digital format.

Once converted to digital format, the signals are demodulated by demodulator 1423 and decoded by decoder 1424 to obtain the encoded data on the received waves. The decoded data is then sent to controller 1425, which sends it to television 1403.

Controller 1450 controls antenna 1401, including the interleaved slotted array elements of both antenna apertures on the single combined physical aperture.

An Example of a Full Duplex Communication System

Figure 20:
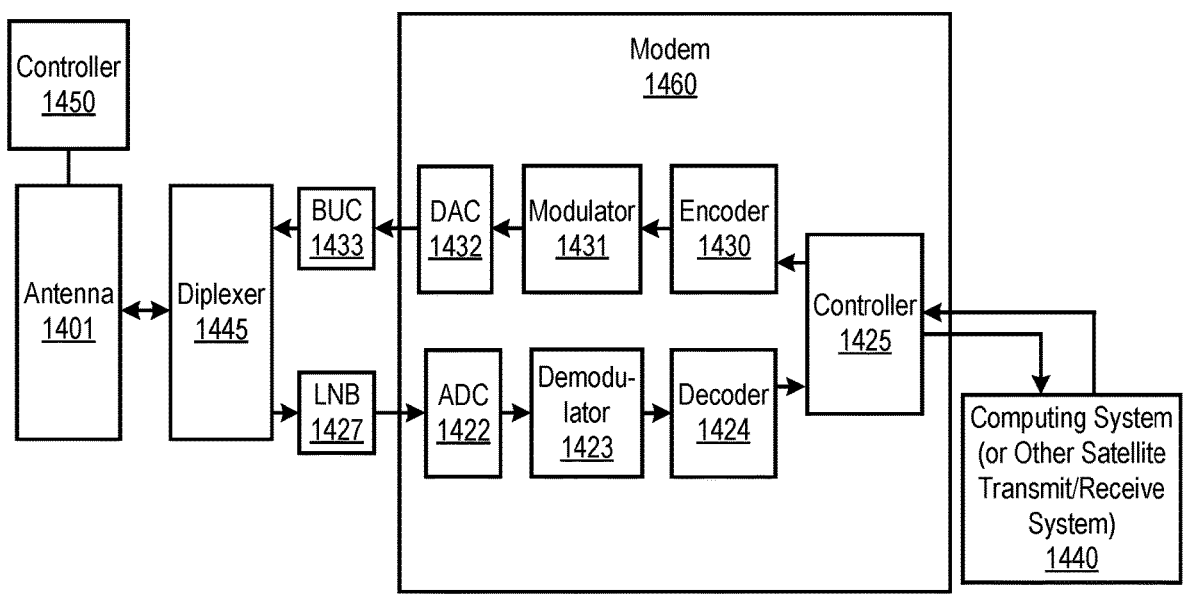
FIG. 20 is a block diagram of another embodiment of a communication system having simultaneous transmit and receive paths.

In another embodiment, the combined antenna apertures are used in a full duplex communication system. FIG. 20 is a block diagram of another embodiment of a communication system having simultaneous transmit and receive paths. While only one transmit path and one receive path are shown, the communication system may include more than one transmit path and/or more than one receive path.

Referring to FIG. 20, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (upconvert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

Note that the full duplex communication system shown in FIG. 20 has a number of applications, including but not limited to, internet communication, vehicle communication (including software updating), etc.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use with an electronically steered antenna having an inertial measurement unit (IMU) and an aperture of radio-frequency (RF) antenna elements configured to generate steered beams, the method comprising:
   a) perturbing a value of one or more of roll, pitch and yaw angles of an antenna orientation produced with the IMU to create one or more variant orientations for which beam direction and polarization are calculated to create beams with the aperture to implement a first search pattern to search for a satellite during acquisition;
   b) computing new scan and polarization angles, in response to perturbed roll, pitch and yaw angles, for each of the variant orientations;
   c) receiving, using the aperture, a radio-frequency (RF) signal from the satellite for each of the variant orientations;
   d) generating one or more receiver metrics representing a received RF signal associated with each of the variant orientations;
   e) selecting, as a new orientation, one of the variant orientations based on the one or more receiver metrics;
   f) repeating a)-e) with the new orientation and a second search pattern narrower than the first search pattern, the new orientation to be used to create additional variant orientations for which beam direction and polarization are calculated to create beams with the aperture to implement the second search pattern to search for the satellite during acquisition; and wherein f) is repeated until an observed satellite signal that meets predefined criteria is received.

2. The method defined in claim 1 wherein the second search pattern has a maximum angle that is decreased in comparison with that of the first search pattern.

3. The method defined in claim 1 wherein the antenna orientation is from a strap-down inertial navigation system (INS).

4. The method defined in claim 1 wherein the one or more signal metrics comprises Signal-to-Noise Ratio (SNR).

5. The method defined in claim 1 wherein the one or more signal metrics comprises Carrier-to-Noise Ratio (C/N).

6. The method defined in claim 1 wherein the RF signal from the satellite is received without physically moving an aperture of the antenna to steer the antenna.

7. The method defined in claim 1 wherein the first search pattern is a random pattern.

8. The method defined in claim 1 wherein the first search and second search patterns are a circular pattern.

9. The method defined in claim 1 wherein the first and second search patterns comprise noncontiguous points in the sky.

10. The method defined in claim 1 further comprising decreasing variance of the pattern after a good signal has been observed.

11. The method defined in claim 1 further comprising:
generating an offset based on the one or more receiver metrics; adding pointing corrections to the scan and polarization angles; and
applying scan and polarization angles with pointing corrections to an antenna.

12. The method defined in claim 11 wherein adding pointing corrections to the scan and polarization angles comprises:
adding receive pointing corrections to receive scan and polarization angles, and adding transmit pointing corrections to transmit scan and polarization angles; and
further wherein applying scan and polarization angles with pointing corrections to an antenna comprises:
applying the receive scan and polarization angles with pointing corrections to a receive portion of the antenna, and
applying the transmit scan and polarization angles with pointing corrections to a transmit portion of the antenna.

13. The method defined in claim 1 wherein perturbing one or more of roll, pitch and yaw angles of an antenna orientation to create variant orientations associated with a first search pattern comprises applying one or more attitude corrections to the roll, pitch and yaw angles of an antenna orientation based on the one or more receiver metrics.

14. The method defined in claim 13 wherein the one or more receiver metrics comprises Carrier-to-Noise Ratio (C/N).

15. An apparatus comprising:
an inertial measurement unit (IMU) configured to perturb a value of one or more of roll, pitch and yaw angles of an antenna orientation to create one or more variant orientations for which beam direction and polarization are calculated to create beams with the aperture to implement a first search pattern to search for a satellite during acquisition;
a computation unit coupled to the IMU and configured to compute new scan and polarization angles, in response to perturbed roll, pitch and yaw angles, for each of the variant orientations;
an electronically steered antenna coupled to the computation unit and responsive to the new scan and polarization angles, the antenna configured to receive an radio-frequency (RF) signal from a satellite for each of the variant orientations;
a modem coupled to the steerable antenna and the IMU and configured to generate one or more receiver metrics representing a received RF signal associated with each of the variant orientations, wherein the IMU is configured to select, as a new orientation, one of the variant orientations based on the one or more receiver metrics, the new orientation to be used to create a new set of variant orientations, by perturbing a value of one or more of roll, pitch and yaw angles of an antenna orientation, for which beam direction and polarization are calculated to create beams to implement a second search pattern that is narrower than the first search pattern to search for the satellite during acquisition,
wherein the IMU is configured to repeatedly generate sets of variant orientations until an observed satellite signal that meets predefined criteria is received by the antenna.

16. The apparatus defined in claim 15 wherein the second search pattern has a maximum angle that is decreased in comparison with that of the first search pattern.

17. The apparatus defined in claim 15 further comprising wherein the antenna orientation is from a strap-down inertial navigation system (INS).

18. The apparatus defined in claim 15 wherein the one or more signal metrics comprises Signal-to-Noise Ratio (SNR).

19. The apparatus defined in claim 15 wherein the one or more signal metrics comprises Carrier-to-Noise Ratio (C/N).

20. The apparatus defined in claim 15 wherein the RF signal from the satellite is received without physically moving an aperture of the antenna to steer the antenna.

21. The apparatus defined in claim 15 wherein the first search pattern is a random pattern.

22. The apparatus defined in claim 15 wherein the first search and second search patterns are a circular pattern.

23. The apparatus defined in claim 15 wherein the first and second search patterns comprise noncontiguous points in the sky.

24. The apparatus defined in claim 15 wherein the computation unit is configured to decrease comprising decreasing variance of the pattern after a good signal has been observed.

* * * * *